(12) United States Patent
Miyashita et al.

(10) Patent No.: US 7,301,969 B2
(45) Date of Patent: Nov. 27, 2007

(54) OFDM TRANSMITTING APPARATUS, RECEIVING APPARATUS AND TRANSMITTING SYSTEM AND SIGNAL STRUCTURE OF TRANSMISSION SIGNAL FOR USE IN THE SAME

(75) Inventors: Atsushi Miyashita, Tokorozawa (JP); Tetsuomi Ikeda, Machida (JP)

(73) Assignees: Hitachi Kokusai Electric Inc., Tokyo (JP); Nippon Hoso Kyokai, Tokyo (JP)

( * ) Notice: Subject to any disclaimer, the term of this patent is extended or adjusted under 35 U.S.C. 154(b) by 1022 days.

(21) Appl. No.: 10/200,329

(22) Filed: Jul. 23, 2002

(65) Prior Publication Data
US 2003/0021297 A1 Jan. 30, 2003

(30) Foreign Application Priority Data
Jul. 24, 2001 (JP) ............................. 2001-222841

(51) Int. Cl.
*H04J 3/06* (2006.01)
(52) U.S. Cl. .................... 370/513; 370/503; 370/512
(58) Field of Classification Search ........... 370/206, 370/207, 208, 210, 319, 480, 482, 487, 503, 370/509, 512, 513, 514, 527, 528
See application file for complete search history.

(56) References Cited

U.S. PATENT DOCUMENTS

| 5,818,813 A * | 10/1998 | Saito et al. ................. 370/208 |
| 6,798,791 B1 * | 9/2004 | Riazi et al. ................. 370/515 |
| 2002/0003773 A1 * | 1/2002 | Okada et al. ............... 370/208 |
| 2003/0031272 A1 * | 2/2003 | Matsumoto ................ 375/308 |
| 2005/0073945 A1 * | 4/2005 | Garcia et al. ............... 370/206 |

FOREIGN PATENT DOCUMENTS

| EP | 0980161 | 2/2000 |
| EP | 0980161 A1 * | 2/2000 |
| EP | 1085740 | 3/2001 |
| JP | 200284255 | 3/2002 |
| WO | 9619055 | 6/1996 |
| WO | 0051275 | 8/2000 |

OTHER PUBLICATIONS

The Video Information Media Society Journal, vol. 52, No. 11, 1998, pp. 32 to 36.
M. Uehara, et al "Transmission Scheme for the Terrestrial ISDB System", IEEE Transactions on Consumer Electronics, IEEE Service Center, vol. 45, No. 1, Feb. 1999, pp. 103-104.

* cited by examiner

*Primary Examiner*—Huy D. Vu
*Assistant Examiner*—Jason Mattis
(74) *Attorney, Agent, or Firm*—Mattingly, Stanger, Malur & Brundidge, P.C.

(57) ABSTRACT

A transmitting system wherein a transmission signal composed of main data and a TMCC signal having a SYNC pattern indicating the header portion and a bit pattern indicating setting information of the main data is transmitted and received. In the transmitting apparatus, the reference timing for starting the input data scramble process is rendered to coincide substantially with the modulation timing for modulating the scrambled data and generating the main data, and the modulation timing is rendered to coincide substantially with the timing for generating the TMCC signal thereby to generate the TMCC signal. From the transmission signal, the receiving apparatus demodulates the main data, extracts the SYNC pattern indicating the header portion from the TMCC signal and inversely scrambles the main data based on the extracted SYNC pattern.

5 Claims, 32 Drawing Sheets

US 7,301,969 B2

OFDM TRANSMITTING APPARATUS, RECEIVING APPARATUS AND TRANSMITTING SYSTEM AND SIGNAL STRUCTURE OF TRANSMISSION SIGNAL FOR USE IN THE SAME

BACKGROUND OF THE INVENTION

The present invention relates to a transmitting apparatus and a transmitting system for transmitting a signal composed of main data Dt and a TMCC (Transmission and Multiplexing Configuration Control) signal having a SYNC pattern indicating a header portion and a bit pattern indicating the setting information of the main data Dt. The present invention also relates to a receiving apparatus for receiving the signal and a signal structure of the signal.

In recent years, the OFDM scheme has begun to be used as a multiplexing scheme for digital transmission. The OFDM scheme is a transmission using a multiplicity of carriers and uses a carrier called TMCC carrier for sending ancillary data in addition to a carrier for sending the main data.

The main data is a transport stream (hereinafter referred to as TS) in which a video signal and an audio signal are compressed by an MPEG process. Until several years ago, an image and a voice had been transmitted by a method using an analog FM. In the analog FM, the S/N of the image and the voice changes with the level of the electric field strength received. In the mobile transmission such as the live broadcast of a marathon accompanied by a sharp change of the electric field strength level, the image telecast tends to have a low quality with considerable noises and disturbances. In the digital transmission such as OFDM, on the other hand, the information is digitized while at the same time error correction processing is used. Therefore, even in the case where the level of the received electric field strength changes, an image of the same quality can be transmitted on the spot in the range where the error correction is effective.

Once the electric field strength is reduced below a critical value, the error cannot be corrected any longer, and the image transmission becomes impossible.

This critical value is inversely proportional to the amount of the data transmitted.

For example, in a 64-QAM (Quadrature Amplitude Modulation) having the coding rate of 5/6 of the convolution code with a large transmission rate of 60 Mbps, the critical value N is about 22 dB, and the limit of the received electric field strength is required to be not lower than about −75 dBm. In a QPSK (Quadrature Phase Shift Keying) having the coding rate of 1/2 of the convolution code with a small transmission rate of 12 Mbps, on the other hand, the critical value N is about 6 dB, and the image can be transmitted with the critical value of the received electric field strength not lower than about −89 dBm. In the case where the transmission rate is low, the compression ratio is increased by MPEG processing, often resulting in an deteriorated image quality.

The environment of image transmission variously changes with the transmission distance as well as depending on whether the transmission is mobile or fixed. The user decides which is to be emphasized, the transmission rate or the transmission limit, in accordance with the transmission environment and determines a setting mode.

A digital FPU (Field Pick-up Unit), in order to meet this requirement, has four types of modulation settings including 64-QAM, 32-QAM, 16-QAM and QPSK, for example. Also, the convolution ratio associated with the intensity of error correction has five correction settings including 1/1 (no coding), 5/6, 3/4, 2/3 and 1/2, for example.

This mode is required to be set identically both at the transmitting and receiving ends.

These settings at the transmitting end can be automatically set at the receiving end if sent to the receiving end, thereby eliminating the need of the operation for sequentially setting the demodulation mode.

The ancillary data for automatic but not manual setting is transmitted using a carrier called TMCC (Transmission and Multiplexing Configuration Control) carrier.

This ancillary data is important information for transmission controlling, and therefore is transmitted by being subjected to BPSK (Binary Phase Shift Keying) modulation having a high transmission endurance.

At the receiving end, the TMCC carrier is demodulated, and by determining the setting mode of the main data, the setting mode for the main data receiver is set. Using this function, the mode at the receiving end can be automatically changed and set simply by only changing the setting at the transmitting end.

For the outline of 64-QAM, etc. and QPSK and error correction, refer, for example, to the Journal of the Institute of Image Information and Television Engineers, Vol. 52, No. 11, 1998, pp. 32 to 36.

SUMMARY OF THE INVENTION

For energy diffusion or dispersion and keeping the transmission contents confidential from the third party, the main data is sometimes required to be scrambled (hereinafter referred to as SCL). The SCL is carried out by inverting the data with the same SCL pattern at the transmitting and receiving ends. At the receiving end, the SCL pattern is generated at the same timing as the SCL pattern is started at the transmitting end, and thus the data is inverted to restore the original data. This scramble process is also referred to as pre-processing.

At the transmitting end, a specific word such as B8h is inserted in the main data for each 13056 bits to mark the scramble start point.

At the receiving end, this mark can be grasped by searching for B8h appearing at intervals of 13056 bits.

Once the transmission path is disconnected, however, the mark B8h of the SCL is lost at the receiving end. Even after the transmission path is restored to normal and the data Drs subjected to SCL is output normally, the normal inverse SCL cannot be carried out before detection of B8h providing a mark for every 13056 bits.

The B8h is not the only code in the data stream. In the case where such codes as ABh and 80h happens to come side by side coincidentally, the A "B8" Oh may be recognized erroneously as B8h.

Further, in the case where the transmission path is perfect, the right B8h can be rediscovered while the retrials being repeated. In the case where the transmission path is not in perfect state and an error remains in the data, however, the code value of B8h providing the mark may often assume B9h, for example, which is one bit different. In such a case, the mark is not present at intervals of 13056 bits, and therefore the mark of SCL is not determined, often delaying the mark detection considerably.

An object of the invention is to provide a transmitting apparatus, a transmitting system and a receiving apparatus in which the position of the mark for carrying out the inverse SCL uniquely from the result of demodulation at the time of demodulation of a TMCC signal can be identified without searching for specific bits such as B8h providing a mark.

Another object of the invention is to provide a signal structure, a transmitting apparatus, a transmitting system and a receiving apparatus for facilitating the detection of the TMCC signal start point at the time of TMCC signal demodulation.

According to one aspect of the invention, there is provided a transmitting system comprising:

a transmitting apparatus for transmitting a transmission signal composed of main data (Dt) modulated by a designated modulation scheme, and a TMCC signal having a SYNC pattern indicating a header portion and a bit pattern indicating the setting information representing the modulation scheme; and a receiving apparatus;

the transmitting apparatus including a pre-processor for pre-processing an input compressed data word string to generate pre-processed frames by, a main data modulator for generating a main data frame string by modulating the pre-processed frames N frames by N frames by the designated modulation scheme in synchronism with the pre-processor, N being a positive integer determined in accordance with the modulation scheme and the convolution coding rate, a TMCC generator operating in synchronism with the generation of each main data frame, for generating a corresponding TMCC signal, an OFDM modulator connected to receive the main data frame and the corresponding TMCC signal, and a transmission high-frequency unit connected to the OFDM modulator;

the receiving apparatus including a receiving high-frequency unit, an OFDM demodulator connected to the receiving high-frequency unit for demodulating the main data frame string and the TMCC signal corresponding to each main data frame, a TMCC regenerator for extracting the setting information from the demodulated TMCC signal and generating a frame signal representing the head position of each main data frame from the SYNC pattern in the demodulated TMCC signal, a main data demodulator for regenerating or recovering the pre-processed frames from each demodulated data frame based on the frame signal and the setting information, a circuitry for generating the head of each pre-processed frame from the frame signal, and an inverse processor for subjecting each pre-processed frame, starting from the head thereof, received from the main data demodulator to an inverse processing of said pre-processing thereby to regenerate or recover an input compressed data word string.

In one embodiment of the invention, the transmitting apparatus has a means whereby the reference timing for starting the scrambling process of the input compressed data is rendered to coincide substantially with the modulation timing for producing the main data by modulating the scrambled data, and the timing of the modulation process is rendered to coincide substantially with the timing of producing the TMCC signal thereby to produce the TMCC signal.

According to another aspect of the invention, there is provided a signal structure comprising:

a main data (Dt) frame; and a TMCC signal having arranged therein a SYNC pattern representing the header portion of the frame and a bit pattern representing the setting information of the main data;

wherein the TMCC signal includes at least a pair of an ancillary SYNC pattern and identification information thereof between the SYNC pattern representing the header portion of a frame and a SYNC pattern representing the header portion of the next frame.

According to still another aspect of the invention, there is provided a signal structure comprising:

a main data (Dt) frame; and a TMCC signal having arranged therein a SYNC pattern representing the header portion of the frame and a bit pattern representing the setting information of the main data;

wherein the TMCC signal further includes superframe information and a scramble pattern at a predetermined timing following the SYNC pattern.

Other objects, features and advantages of the invention will become apparent from the following description of the embodiments of the invention taken in conjunction with the accompanying drawings.

DESCRIPTION OF THE EMBODIMENTS

Figure 1:
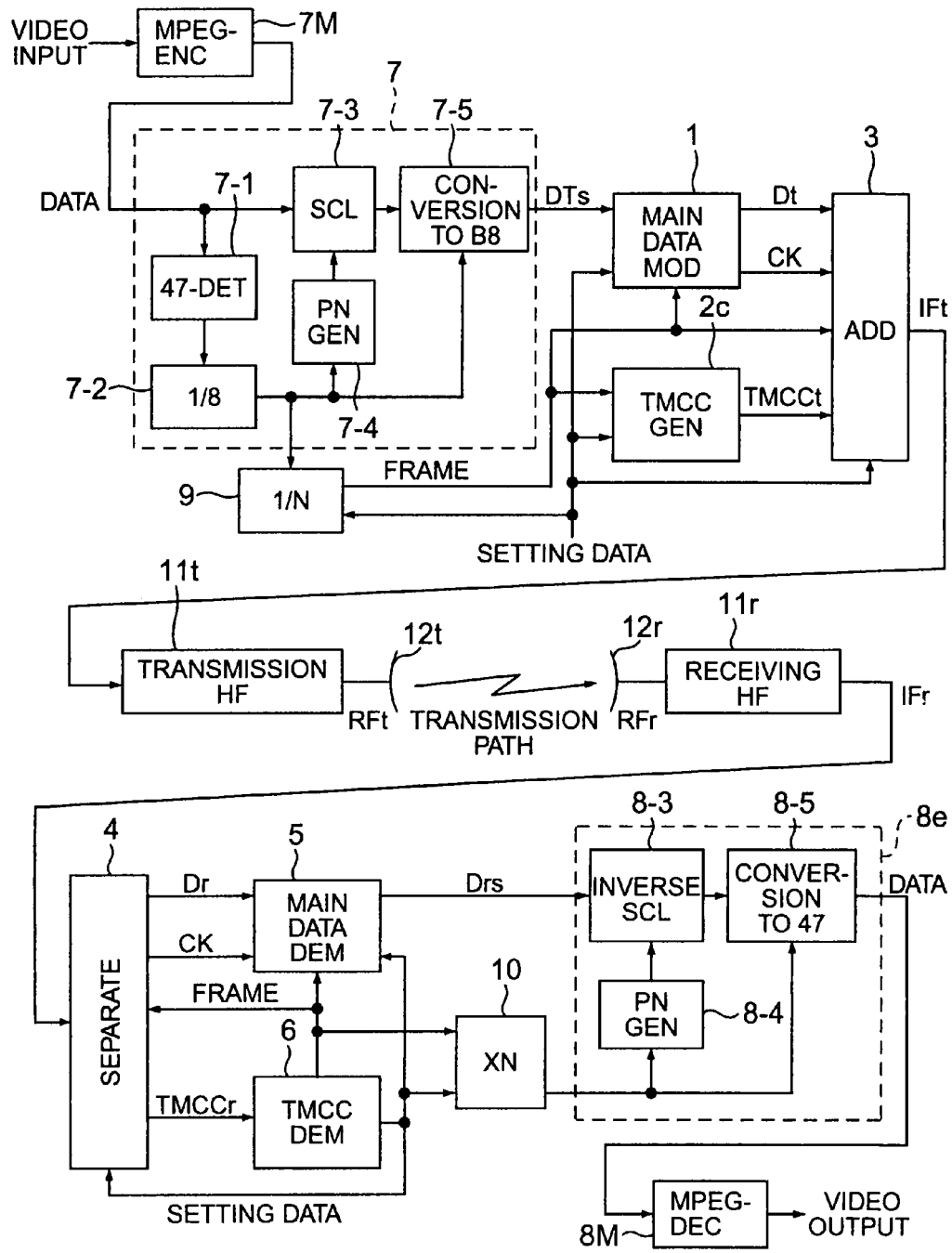
FIG. 1 is a diagram showing a general configuration of a transmitting system according to a first embodiment of the invention.

Embodiments of the invention will be explained below with reference to the accompanying drawings. Similar or identical component parts are designated by the same reference numerals, respectively.

Prior to explanation of the embodiments, an example of configuration of a transmitting system for transmitting a video signal to which the invention has not been applied yet will be explained with reference to FIGS. 22 and 23.

Figure 22:
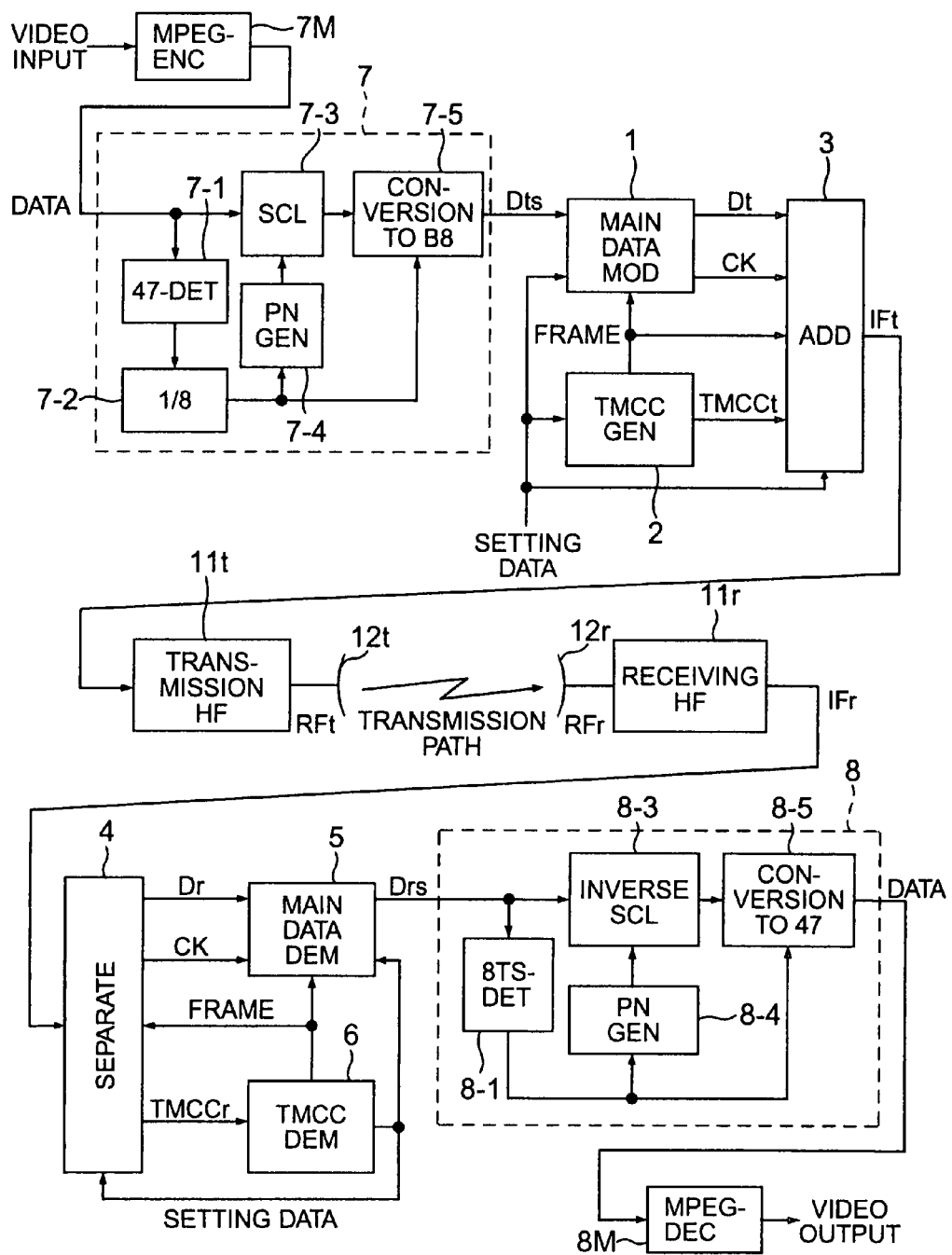
FIG. 22 is a diagram showing an example of the configuration of a transmitting system for transmitting the video signal according to other than the present invention.

FIG. 22 shows a configuration of a transmitting system for transmitting a video signal.

In the transmitting apparatus at the transmitting end, the video signal is input to a MPEG-ENC7M and becomes compressed data. This compressed data make up main data. The transmission state information such as the modulation mode constitute ancillary data. The main data Data is scrambled by a SCL unit 7 into data Dts. The SCL unit 7 is also called a pre-processor.

The SCL unit 7 detects the code 47h existing at periods of 204 W (words) of Data through a 47-DET 7-1, and detects the eighth 47h through an 1/8 unit 7-2. A pulse based on this position as a reference is sent to a PN generator 7-4 for resetting. A PN pattern is initialized to generate a specific pattern for SCL. With this specific pattern for SCL, the input Data is inverted by scrambling. In a B8h substitution unit 7-5, the eighth 47h is substituted into B8h through the output of the 1/8 unit 7-2 thereby to produce the output data Dts. Since 1 word is 8 bits, B8h is produced for each 13056 bits.

The data Dts is input to a main data modulator 1 and becomes the transmission data Dt by being mapped for every predetermined data, for example.

The setting data constituting the conditions for producing the transmission data Dt is input to a mode setting terminal of the main data modulator 1 and a TMCC generator 2. The main data modulator 1 performs the modulate operation in accordance with the frame pulse from the TMCC generator 2. The output Dt modulated by the main data modulator 1 and the output TMCCt signal modulated by the TMCC generator 2 are combined by an integrator 3 operating based on the frame pulse and then subjected to OFDM modulation, thus becoming an IFt signal consisting of a multicarrier having a bandwidth of about 17 MHz around 130 MHz. The integrator 3 may also be called an OFDM modulator.

The IFt signal generated in the integrator 3 is sent to a transmission high-frequency unit 11*t* and changed in frequency to a microwave signal and power amplified. A antenna 12*t* transmits the modulated wave as a radio wave.

The radio wave that has reached a receiving antenna 12*r* of the receiving apparatus at the receiving end through the transmission path constituted of a space is input to a receiving high-frequency unit 11*r*. The receiving high-frequency unit 11*r* amplifies a weak signal and changes it to an intermediate frequency signal IFr in 130 MHz-band. This signal IFr is input to a separator 4.

The IFr signal is separated and demodulated by the separator 4 into a main data component Dr and an ancillary data component TMCCr. The separator 4 may also be called an OFDM demodulator. Each signal is input to a main data demodulator 5 and a TMCC regenerator 6. The TMCC regenerator 6 sends to the main data demodulator 5 the frame pulse regenerated based on the information extracted from the input data.

The separator 4 and the main data demodulator 5 performs the demodulate operation based on the frame pulse.

Further, the various setting information extracted by the TMCC regenerator 6 are input to the mode setting terminal of the main data demodulator 5 thereby to determine the conditions for producing the data Drs. The output data Drs of the main data demodulator 5 is input to the inverse SCL unit 8. In the inverse SCL unit 8, the B8h code existing at periods of 13056 bits detected through the 8TS-DET unit 8-1, and the pulse generated based on the position of the B8h code is sent to the PN generator with reset 8-4 thereby to generate an inverse SCL pattern signal. This inverse SCL pattern signal inversely converts the Drs signal through the inverse SCL operator 8-3, and substitutes 47*h* for B8h inversely to the transmitting end in the 47h substitution unit 8-5 thereby to restore the pre-scramble data Data. This data is extended with MPEG-DEC8M thereby to restore the original video signal.

The PN generators with reset 7-4, 8-4 initialize the PN pattern generated upon reset input. In the case where the reset is not input, on the other hand, the PN pattern is initialized automatically after 13056 clocks.

Figure 23:
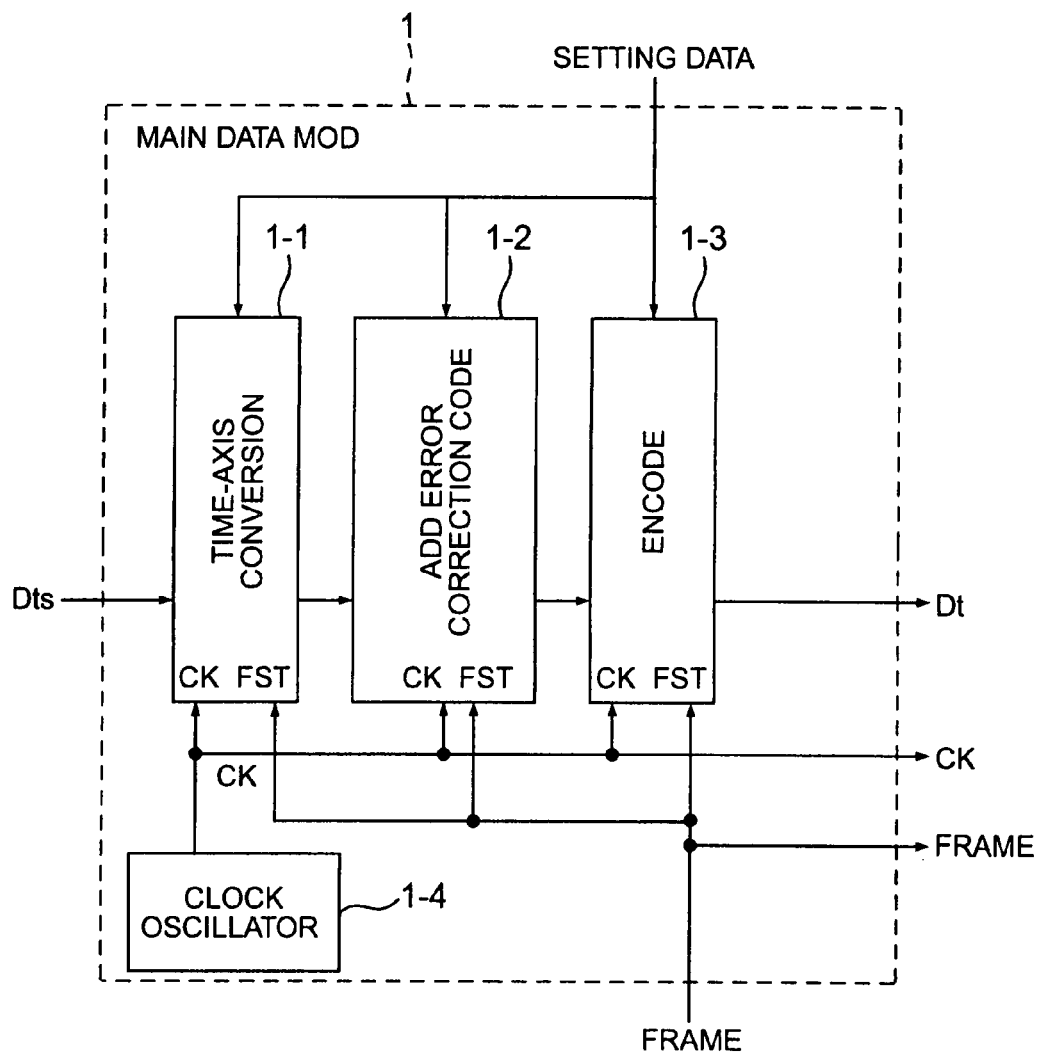
FIG. 23 is a diagram showing a configuration of the main data modulator of FIG. 22.

FIG. 23 shows a configuration of the main data modulator 1 of FIG. 22.

The setting data is input to a temporal (time-axis) converter 1-1, an error correction code adder 1-2 and a coder 1-3 thereby to determine the operation mode of each unit.

The temporal converter 1-1 performs the temporal or time-axis conversion for providing a time space for inserting the parity information generated in the post-processing stage, the TMCC information added and the CP information (Continual Pilot signal). This operation is performed in accordance with the clock signal from the clock oscillator 1-4 based on the frame signal. The converter 1-1 operates at higher speed partially than the input to secure available time space.

The error correction code adder 1-2 generates and adds the parity signal by the arithmetic operation based on the input data.

This operation is performed in accordance with the clock signal from the clock oscillator 1-4 based on the frame signal. The parity signal is added to the time space made available in the previous stage.

Taking the processing delay time of the temporal conversion process in the preceding stage into account, the process is started upon the lapse of a predetermined time after frame signal input. The subsequent processing operation is also started based on the frame signal taking the processing delay in the preceding stage into account.

The coder 1-3 treats the input data bits as a block in accordance with the modulation mode designated by the setting data thereby to map them to the I and Q axes. In the case of the 64-QAM mode, the input 6 bits are combined as a block and converted into a signal corresponding to any of 64 (8×8) points. This job of combining the 6 bits is also performed based on the frame signal.

In the case where the 16-QAM mode is designated, 4 bits are combined and converted to a signal corresponding to any of 16 (4×4) points.

The clock oscillator 1-4 applies a predetermined frequency CK for operation to each processor described above.

Figure 24:
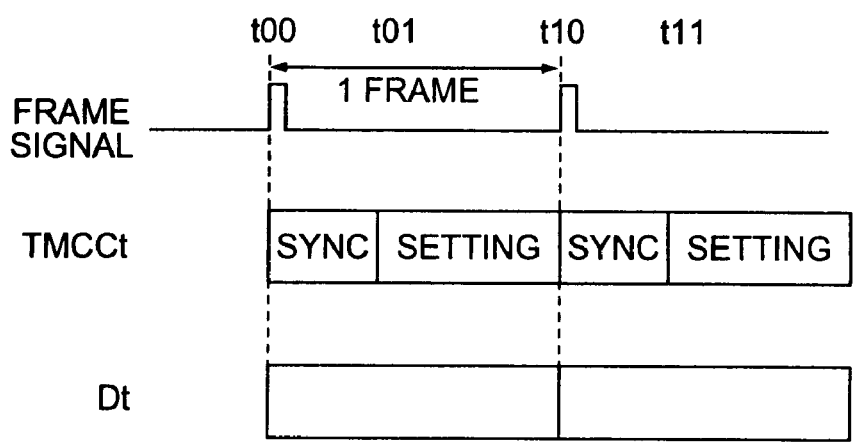
FIG. 24 is a diagram showing an example of the frame signal, the TMCCt signal and the data Dt.

FIG. 24 shows an example of the frame signal, the TMCCt signals and the signal Dt. About 16 bits of a specific pattern for SYNC are arranged at time point t00, and the setting data are arranged from the subsequent time point t01.

The following description assumes that a frame is comprised of 204 symbols. Note that the symbol here refers to one symbol of the OFDM signal.

At time point t10 when the next frame is started, the bits of a specific pattern for SYNC are arranged again, and the setting information are arranged from the subsequent time point t11. After that, this process is repeated as long as the setting information remains unchanged. At the receiving end, the specific code bits for SYNC are found out by utilizing the fact that the specific code bits appear at regular time intervals, and thus the subsequent information is retrieved.

Figure 25:
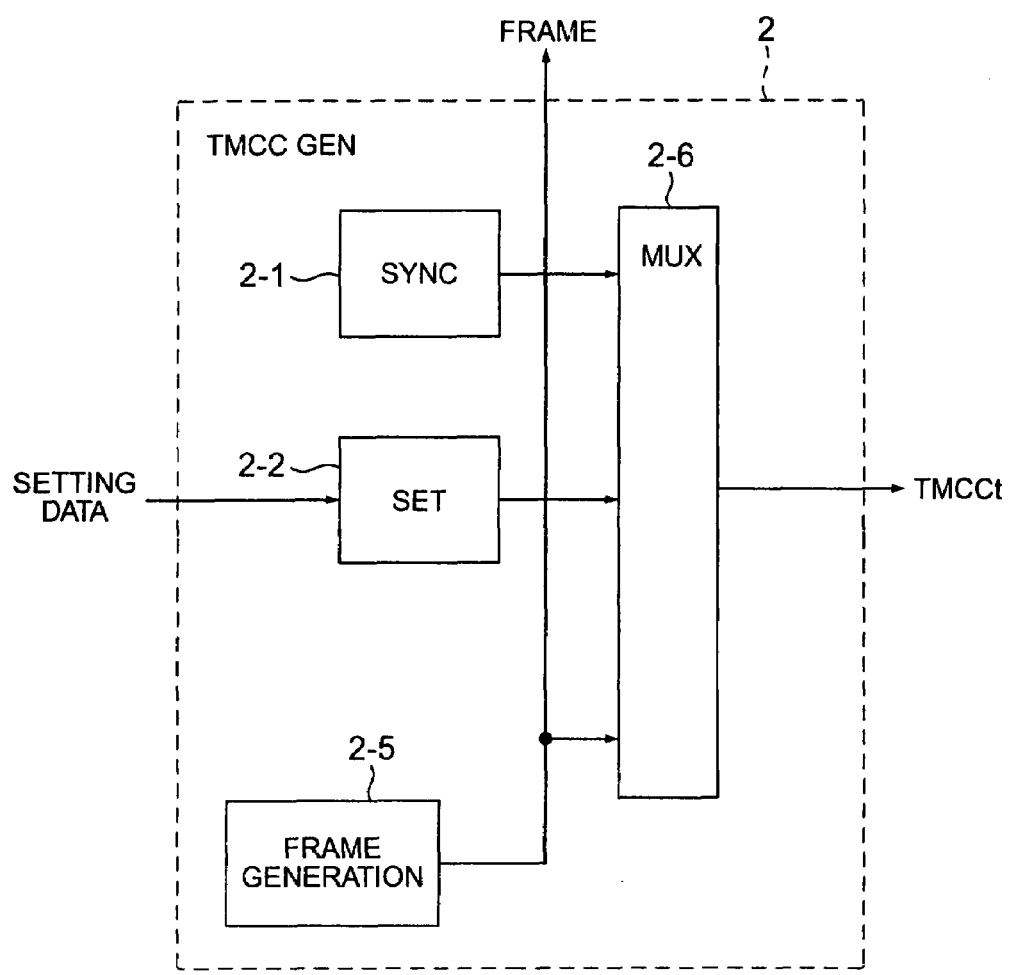
FIG. 25 is a diagram showing a configuration of the TMCC generator of FIG. 22.

FIG. 25 shows a configuration of the TMCC generator 2 of FIG. 22.

The setting mode signal from an external source is input to a setting information generator 2-2. The frame signal from a frame generator 2-5 is connected to a multiplexer MUX 2-6. The output from the SYNC generator 2-1 and the setting information generator 2-2 are input to the multiplexer MUX 2-6.

The multiplexer MUX 2-6 outputs the signal TMCCt by sequentially switching the SYNC code and the setting information input thereto in accordance with the input frame signal.

Figure 26:
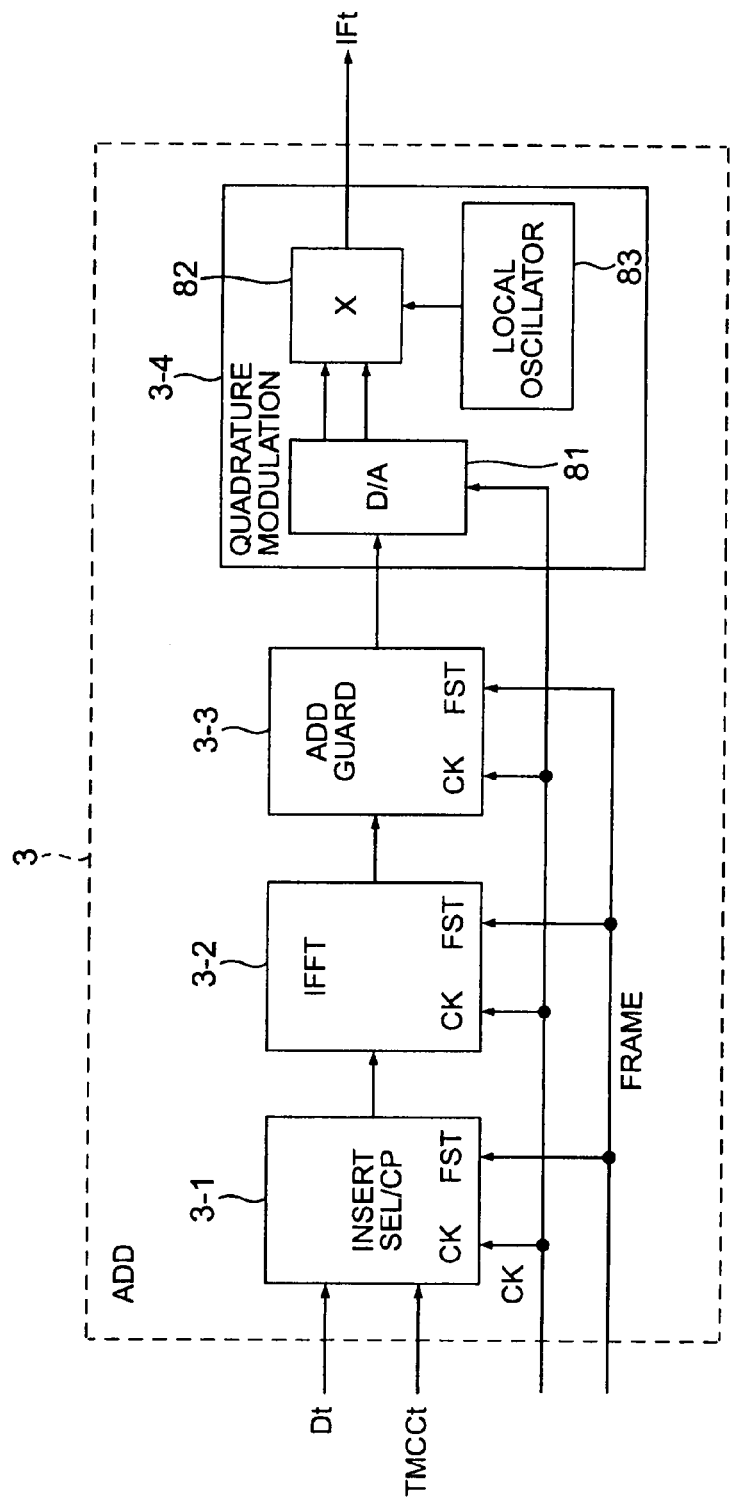
FIG. 26 is a diagram showing a configuration of the integrator of FIG. 22.

FIG. 26 shows a configuration of the integrator 3 of FIG. 22.

In a SEL/CP insertion unit 3-1, an input signal Dt, another input signal TMCCt and a CP signal providing a reference pilot generated by itself are switched with the frame signal as a reference timing.

Figure 27:
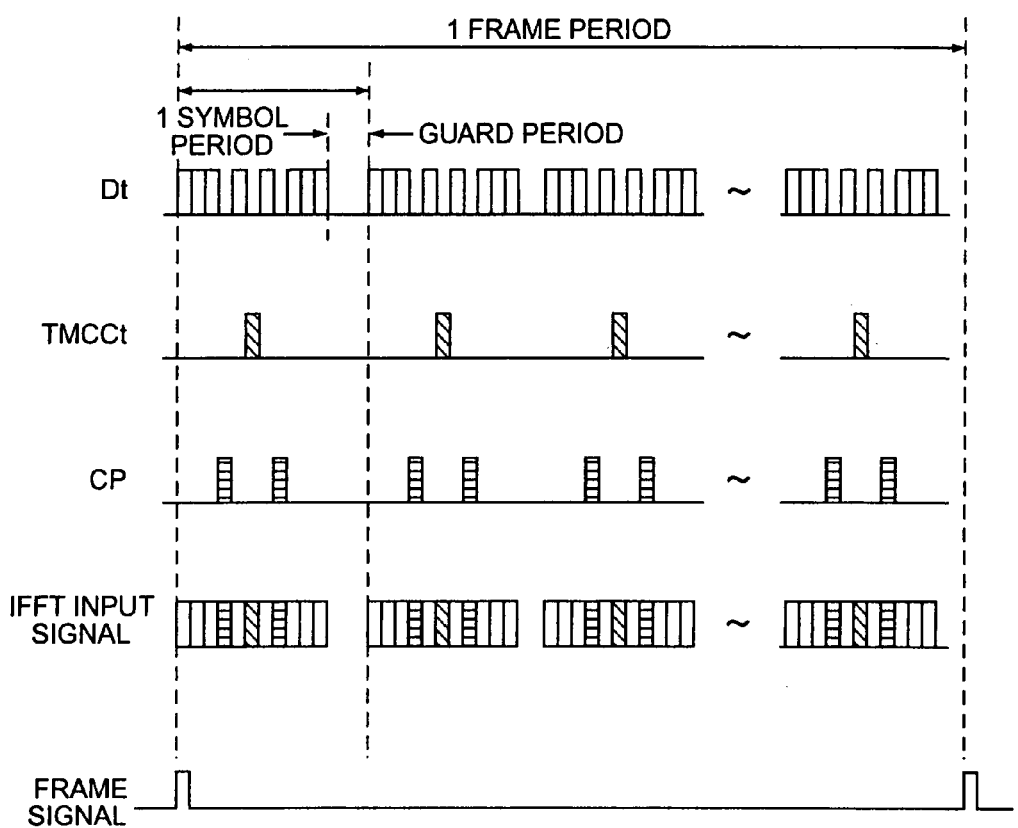
FIG. 27 shows data representing the operation in FIG. 26, etc.

The operation of the integrator 3 is shown in FIG. 27. The Dt signal from the main data converter 1 has a time space available for the TMCCt and CP signals. These two signals are selected and inserted in the available time space. The CP signal inserted, for example, for every eight data is input to the IFFT unit 3-2 in the next stage, and the TMCCt signal is also assigned to the available time space designated in advance.

Returning to FIG. 26, the operation of each unit will be explained.

The IFFT unit 3-2 carries out an inverse Fourier Transformation, treating 1024 data, for example, as constituting a frequency component to generate a waveform corresponding to about 50 µs thereby to perform a multicarrier modulation. The first input data determines the modulation of the carrier of the lowest frequency, and the data next input determines the modulation of second lowest frequency. After that, this process is repeated 1024 times, with the result that a waveform for about 50 µs corresponding to what is called one symbol is generated and output.

This operation is also started based on the frame signal.

A guard adder 3-3 arranges a waveform corresponding to the 1/16 symbol period at the end of one symbol of the input signal in an available time space of the symbol signal, and thus generates a waveform of the 17/16 symbol period. The 1/16 period signal constituting a portion of one symbol is output twice. This period is called the guard interval. This operation is started also based on the frame signal.

A quadrature modulator 3-4 converts the input signal into a analog baseband signal by DA conversion, and performs a frequency conversion thereon by multiplying the analog baseband signal by a local oscillation signal generated from the local oscillator 83 by means of a multiplier 82.

Figure 28:
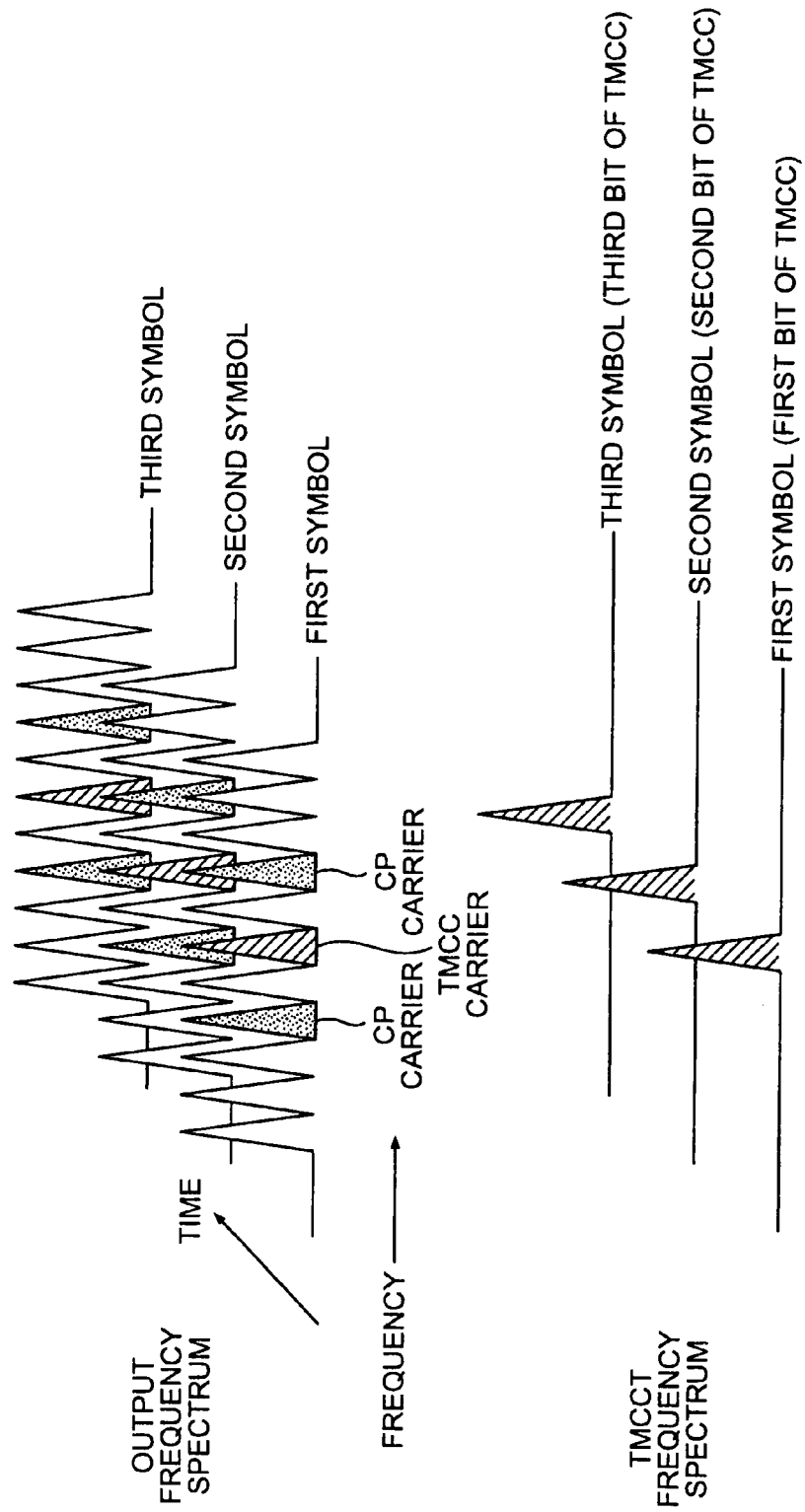
FIG. 28 is a diagram schematically showing the OFDM modulated wave output from the integrator of FIG. 22.

FIG. 28 is a conceptual diagram showing an OFDM modulation wave providing the output of the integrator 3 shown in FIG. 22. An image of all the carriers is shown in the upper portion of FIG. 28.

This waveform is configured of a multicarrier including a multiplicity of carrier waves.

Most of the carrier waves are data carriers shown hollow, and are modulated based on the Data information. In the case where 64-QAM is employed for coding, a given carrier is determined by the information of 6 bits.

A CP carrier shown gray for measuring the frequency deviation and the phase or amplitude deviation of the oscillator 83 is inserted at regular intervals. The CP carrier is modulated with a fixed amplitude and phase.

Further, a TMCC carrier shown in oblique hatch for sending the TMCC information is inserted. The 1-bit information of this carrier is coded with BPSK.

The carrier wave is changed to the next information for every one symbol period.

The frequency arrangement mentioned above remains the same without regard to time.

Since the CP carrier has been modulated with a predetermined amplitude and phase, the inverse correction of the phase and amplitude to restore the deviation of the amplitude and phase to a predetermined constant value is carried out for all the carriers to attain the amplitude and phase near to the values thereof associated with the transmission of the signal containing the data carrier, by the correcting unit 4-7 shown in FIG. 29 described later.

Both the amplitude and phase of the data carrier undergo a change depending on the combination of six bits coded. It is therefore difficult to use the data carrier for the distortion correction of the transmission path, and hence the CP carrier modulated with predetermined information is indispensable.

Figure 29:
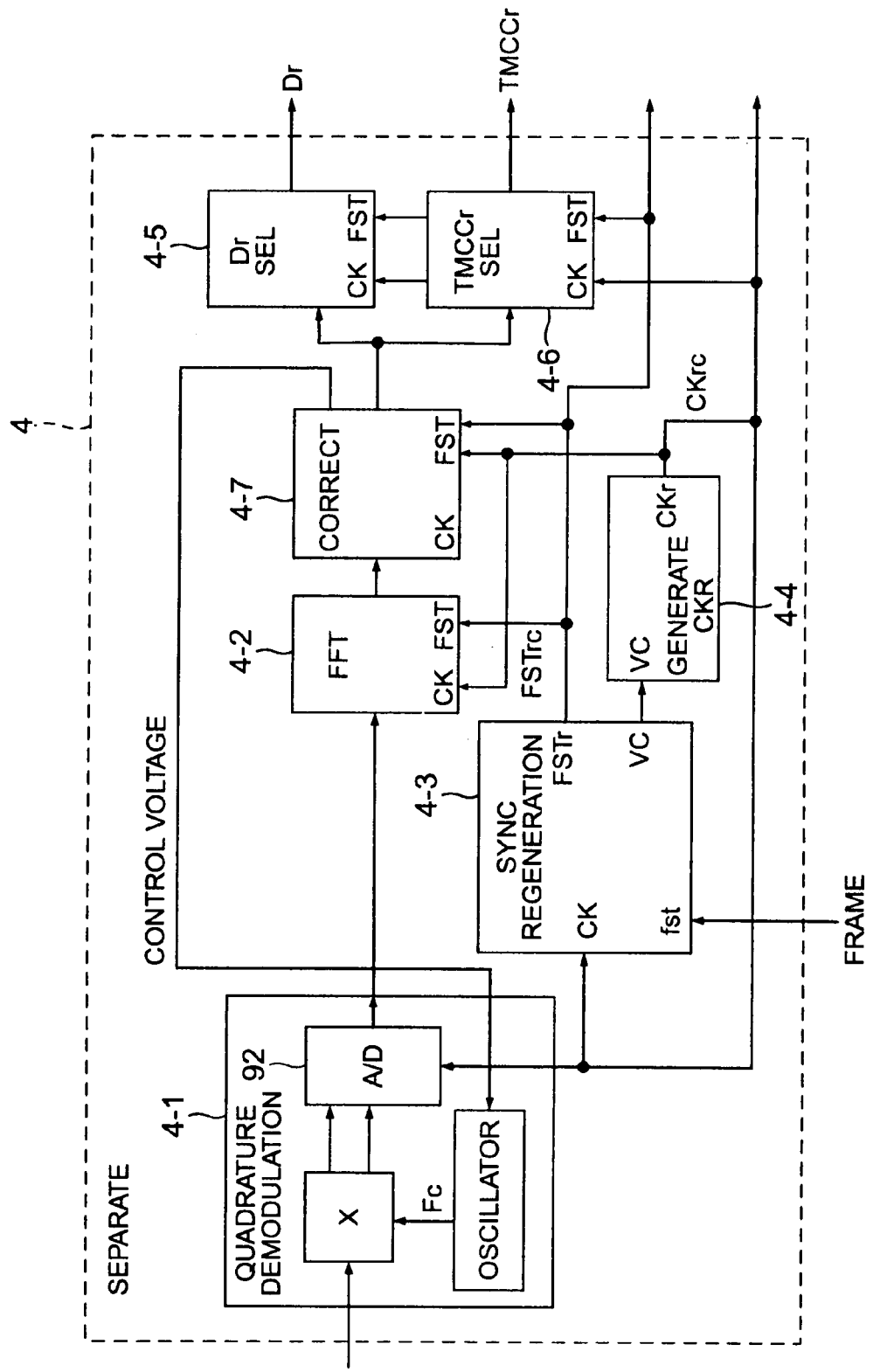
FIG. 29 is a diagram showing a configuration of the separator of FIG. 22.

FIG. 29 shows a configuration of the separator 4 of FIG. 22.

The output of the receiving high-frequency unit is input to the quadrature demodulator 4-1, and after being changed in frequency to the baseband signal, becomes a digital signal.

This output is input to the FFT unit 4-2 and converted from time component signals to frequency component signals which are output in the ascending order of the frequency component. The conversion is performed based on the signal CKrc and the FSTrc pulse generated based on the frame signal.

The sync regenerator 4-3 is connected to the CKrc generator 4-4, and controls the frequency of CKrc based on the phase difference between the frame signal and the self-generated FSTrc. Also, the FSTrc signal providing the reference of operation is supplied to each unit. The timing of the sampling process by the A/D converter 92 in the quadrature demodulator 4-1 is also determined by CKrc.

The corrector 4-7 corrects the signal of all the bandwidths distorted in the transmission path, based on the phase and amplitude of the CP input thereto. Also, the frequency and phase of the oscillator 93 in the quadrature demodulator 4-1 are controlled to remove the distortion.

These operations are performed based on the signal CKrc and the FSTrc pulse generated on the basis of the frame signal.

The output of the corrector 4-7 is input to a Dr selector 4-5 and a TMCCr selector 4-6. The Dr selector 4-5 gates and outputs only the portion corresponding to the data Dr based on the CKrc and the FSTrc pulse generated on the basis of the frame signal.

The TMCCr selector 4-6 also operates based on the CKrc and the FSTrc pulse generated on the basis of the frame signal, and gates and outputs only the portion corresponding to TMCCr.

Figure 30:
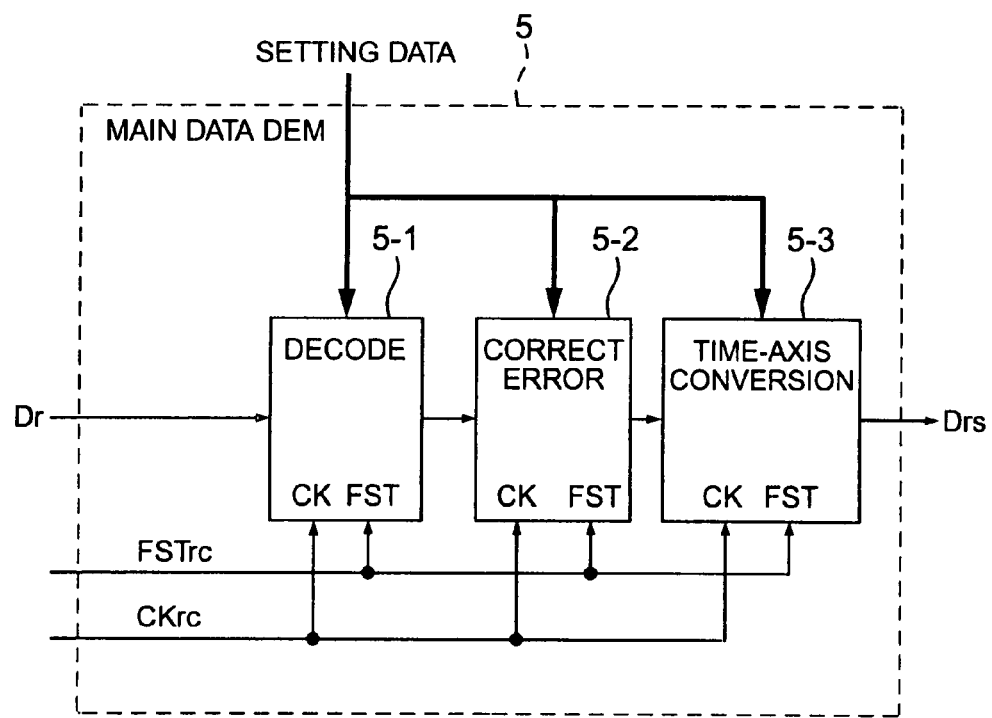
FIG. 30 is a diagram showing a configuration of the main data demodulator of FIG. 22.

FIG. 30 shows a configuration of the main data demodulator 5 of FIG. 22.

The setting data are input to a decoder 5-1, an error corrector 5-2 and a temporal (time-axis) converter 5-3 thereby to determine the operation mode for each unit.

The decoder 5-1 identifies the data value sent thereto based on the mapping point of the data Dr input thereto. The timing of detecting the presence or absence of the signal involved is determined based on the signal CKrc and the FSTrc pulse generated based on the frame signal.

The error corrector 5-2 corrects the error based on the parity information of the signal identified. This conversion is also performed on the basis of the signal CKrc and the FSTrc pulse generated based on the frame signal.

The temporal converter 5-3 converts the error-corrected intermittent signal to continuous data. This conversion also is performed on the basis of the signal CKrc and the FSTrc pulse generated based on the frame signal.

Figure 31:
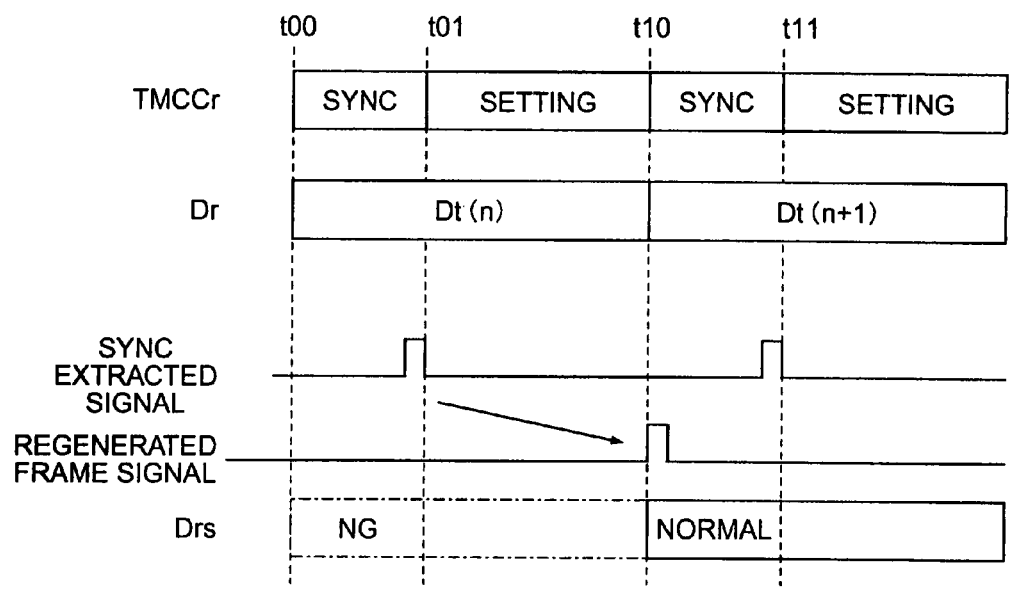
FIG. 31 is a diagram showing the TMCCr signal and the data Dr.

FIG. 31 shows the TMCCr signal and the data Dr.

16 bits or so of the specific pattern for SYNC are arranged from time point t00 to t01. It therefore requires until reaching the time point t01 to determine whether the coincidence or matching with a specific pattern is made. Specifically, the SYNC extraction signal indicating the presence of SYNC is generated at around t01.

An interval, break point or the starting point of the data Dt(n) is present at time point t00, but was the one in the past when viewed at time point t01. Thus, the SYNC extraction signal generated at time point t01 is delayed to the time point t10, and Dt(n+1) is used as a starting point. Consequently, the interval or the starting point detected from TMCCr is used for specifying the starting point of the next frame delayed by about one frame period. Even in the case where the transmission condition is normalized immediately before t00, therefore, the data Dt(n) cannot be used as it is not demodulated normally.

Figure 32:
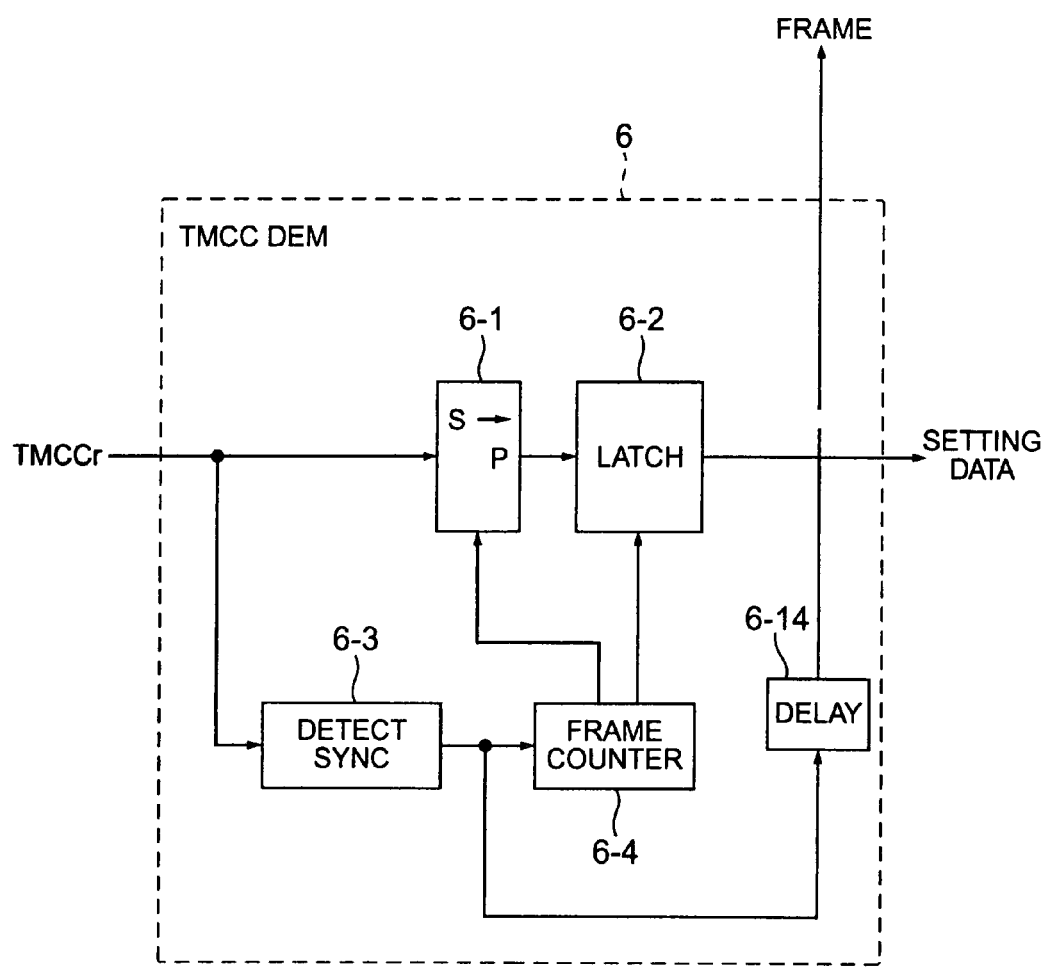
FIG. 32 is a diagram showing a configuration of the TMCC regenerator of FIG. 22.

FIG. 32 shows a configuration of the TMCC regenerator 6 shown in FIG. 22.

The received signal TMCCr is input to the SYNC detector 6-3 and the serial/parallel converter 6-1. The output of the SYNC detector 6-3 is input to the reset terminal of the frame counter 6-4 and the delay unit 6-14. From the frame counter 6-4, a latch signal is output for capturing the information paralleled at a predetermined timing. The setting information sent from the transmitting end is captured and output by the latch 6-2.

The delay unit 6-14 delays the SYNC extraction signal by time t10-t01 (about one frame period) and outputs it as a frame signal.

Figure 33:
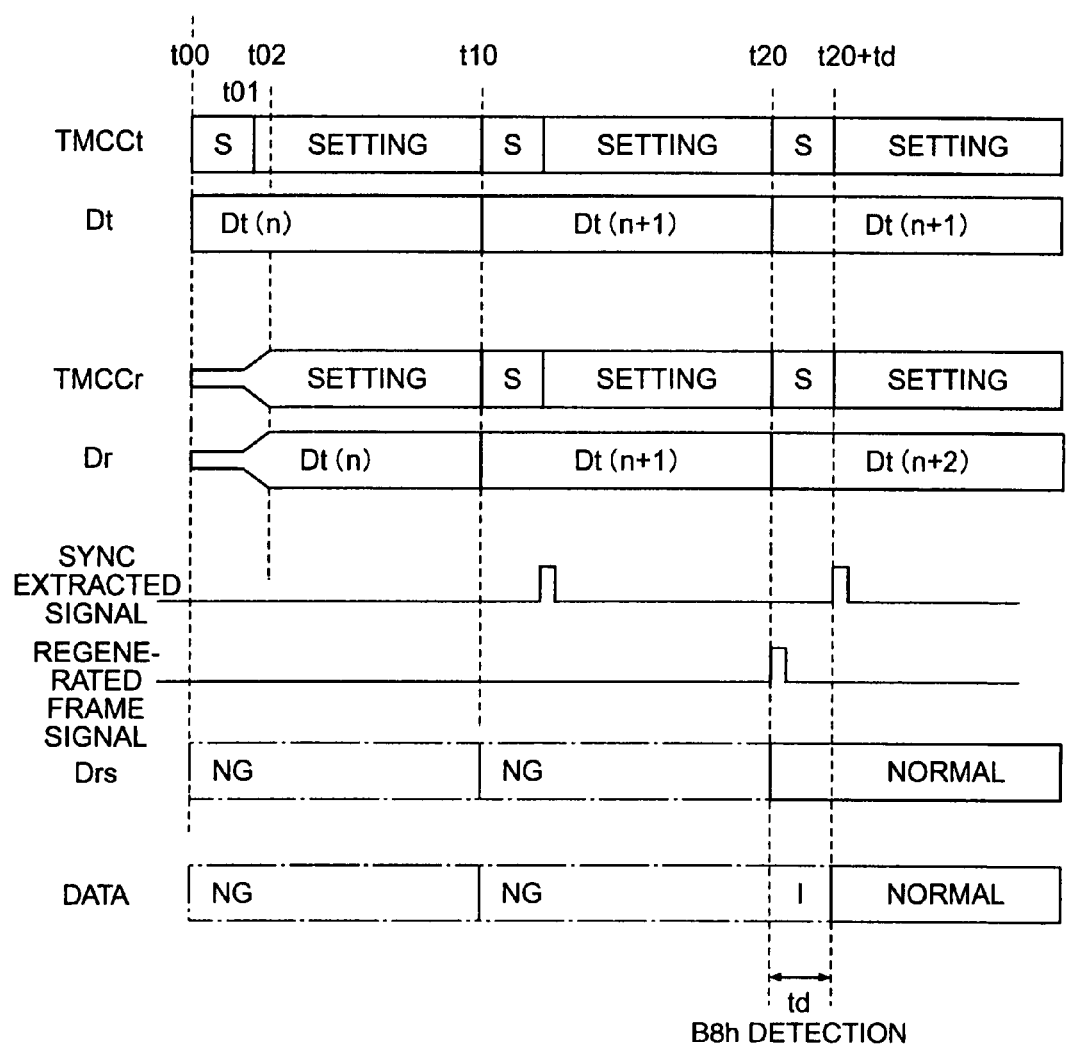
FIG. 33 is a diagram showing an example of the sequence of the process.

FIG. 33 shows an example of the sequence of the processing.

It is assumed that the transmission is an non line-of-sight propagation until time point t02 wherein the level of the receiving electric field strength is too weak. The SYNC existing between time point t00 indicating the starting point of Dt(n) and time point t01 has such a weak level of the electric field strength that it cannot be detected.

The signal SYNC is extracted at time point t10 when the electric field strength level is restored to normal. Since the output of the regeneration frame signal is delayed about one frame, however, the correct frame signal is not supplied to the main data demodulator 5 until time point t20. After time point t20, the output Drs of the main data demodulator 5 becomes normal. Nevertheless, the inverse SCL is not yet normal. The inverse SCL unit 8 detects the code of B8h providing a reference, from among the data string obtained by decoding Dt(n+2), and performs the inverse scrambling based on this position. As a result, the inverse SCL is normally carried out from time point t20, for example, when B8h begins to appear. Thus, the normal process is carried out after time point t20+td.

The data carrier is mapped with 16-QAM or 64-QAM. In the case where the transmission condition is bad, therefore, it is difficult to specify the correct mapping point, and the value assigned at the transmitting end cannot be transmitted accurately. In such a case, the information B8h to provide a reference is deformed to a different value such as B9h, and therefore the probability of correctly extracting the reference is reduced.

The transmission of the TMCC information is modulated with a mode called BPSK or DBPSK having a high error resistance. Further, normally, the same information is assigned to a plurality of carriers. By determining them by a majority decision, therefore, a very high reliability is secured as compared with the transmission of the main data.

As described above, the scramble process is sometimes required to diffuse or disperse energy or keep the transmitted contents confidential from the third party. In SCL, the SCL pattern is started at every 13056 bits, which is marked in a specific word such as B8h by the transmitting apparatus at the transmitting end and the receiving apparatus at the receiving end.

At the receiving end, this specific word is detected and the inverse scramble operation is performed.

Once the transmission path is disconnected and the data Drs subjected to SCL becomes abnormal at the receiving end, however, the mark of SCL is lost and the erroneous inverse SCL process is performed. Even in the case where the transmission path is restored to normal and the data Drs subjected to SCL becomes normal subsequently, the correct inverse scramble cannot be carried out before detecting the mark B8h.

Further, in the case where the transmission path condition is not perfect and an error remains in the Drs data, the probability of detection of the mark B8h is reduced, thereby making it impossible to carry out the inverse SCL process correctly for long time in some cases.

The reference timing of the demodulation process including the SCL process described above is obtained from the interval position or break position of the TMCC signal. This interval or break position is determined on the basis of the position of the specific information (main SYNC) such as 35EEh detected in the TMCC signal.

In the case where the time point at which the transmission path is restored from disconnection is immediately after an interval of the TMCC signal, the specific information cannot be detected and therefore the interval cannot be found until about one frame later. As a result, the normal data cannot be output before one frame later, and the restoration is delayed.

Further, in the case where the scramble process is performed for energy diffusion or dispersion or keeping the transmitted contents confidential from the third party, the SCL pattern is reset at regular time intervals at both the transmitting and receiving ends. At the receiving end, however, even in the case where the disconnection of transmission is restored to normal condition, the normal decode operation is impossible until the reference for the inverse scramble process is clarified by the signal indicating the period of resetting. This leads to the problem that a considerable length of time is required before restoration from the transmission disconnection.

FIG. 1 shows a general configuration of the transmitting system according to a first embodiment of the invention.

In FIG. 1, the same component elements as the corresponding ones in FIG. 22 are designated by the same reference numerals, respectively. In the transmitting apparatus at the transmitting end, a SCL reference synchronous frame generator 9 is added, and the TMCC generator 2 is designated as 2c, while in the receiving apparatus at the receiving end, a frame reference synchronous 8TS generator 10 is added and the inverse SCL unit 8 is designated as 8e, with the circuit connection changed.

The PN reset signal of the SCL unit 7 is input to the SCL reference synchronous frame generator (hereinafter referred to as a synchronous frame generator) 9. The setting data is connected to the synchronous frame generator 9, the main data modulator 1, the TMCC generator 2c and the integrator 3.

The synchronous frame generator 9 determines the conditions of the frame signal from the input Data and the transmission capacity of the main data based on the setting data.

Specifically, the synchronous frame generator 9 detects the code 47h existing at periods of 204 words of Data through 47-DET 7-1, and upon detection of the eighth 47h through the 1/8 unit 7-2, the pulse based on this position is frequency-divided by N thereby to generate a frame pulse synchronous with the PN reset signal of the SCL unit 7.

Now, a specific example of the frequency division value N of the synchronous frame generator 9 in a representative setting mode will be explained.

Modulation scheme: 64-QAM, N 420 for convolutional coding rate of 5/6

Modulation scheme: 16-QAM, N 252 for convolutional coding rate of 3/4

Modulation scheme: QPSK, N 84 for convolutional coding rate of 1/2

Assume that the transmission bit rate for 64-QAM with the convolutional coding rate of 5/6 is 59.648 Mbps, the transmission bit rate for 16-QAM with the convolutional coding rate of 3/4 is 35.789 Mbps, and the transmission bit rate for QPSK with the convolutional coding rate of 1/2 is 11.930 Mbps. Information of six bits can be sent for each carrier of 64-QAM, information of four bits can be sent for each carrier of 16-QAM, and information of two bits can be sent for each carrier of QPSK.

As compared with QPSK, therefore, 64-QAM can transmit three times as much data, and in the case of no convolutional coding, the transmission is possible at the bit rate corresponding to the number of data carriers and the number of bits determined by the above-mentioned modulation schemes (64-QAM to QPSK). In the case of the convolutional coding rate of 5/6, the transmission is possible at the bit rate corresponding to the number of the data carriers and the number of bits determined by the above-mentioned modulation schemes (64-QAM to QPSK) multiplied by 5/6. In the case of the convolutional coding rate of 1/2, on the other hand, the transmission is possible at the bit rate corresponding to the number of data carriers and the number of bits determined by the above-mentioned modulation schemes (64-QAM to QPSK) multiplied by 1/2.

Thus, the bit rate for the frame pulse can be determined by calculating the product of the number of bits determined by the modulation scheme, the convolutional coding scheme and K/13056, that is, (number of bits determined by modulation scheme)×(convolutional coding scheme)×(K/13056), where K is a constant determined by the number of OFDM carriers and sampling clocks. The value N for the synchronous frame generator 9 is acquired from the setting data.

The frame signal generated in this way from the synchronous frame generator 9 is connected to the main data modulator 1 and the TMCC generator 2c.

Figure 2:
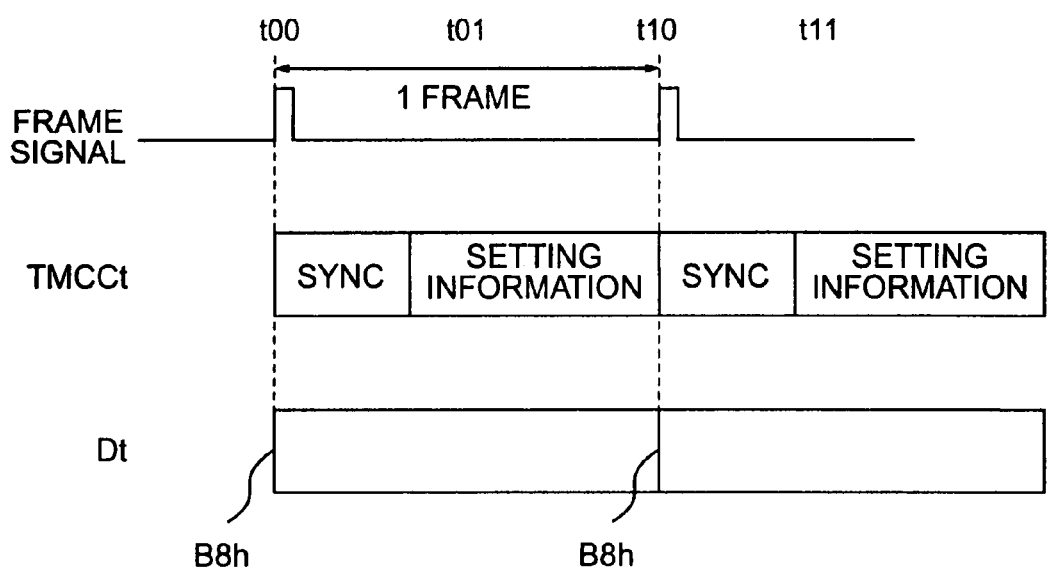
FIG. 2 is a diagram showing a frame signal, a TMCC signal and a Dt signal.

In synchronism with the frame signal, the TMCC generator 2c generates the TMCCt signal as shown in FIG. 2.

Figure 3:
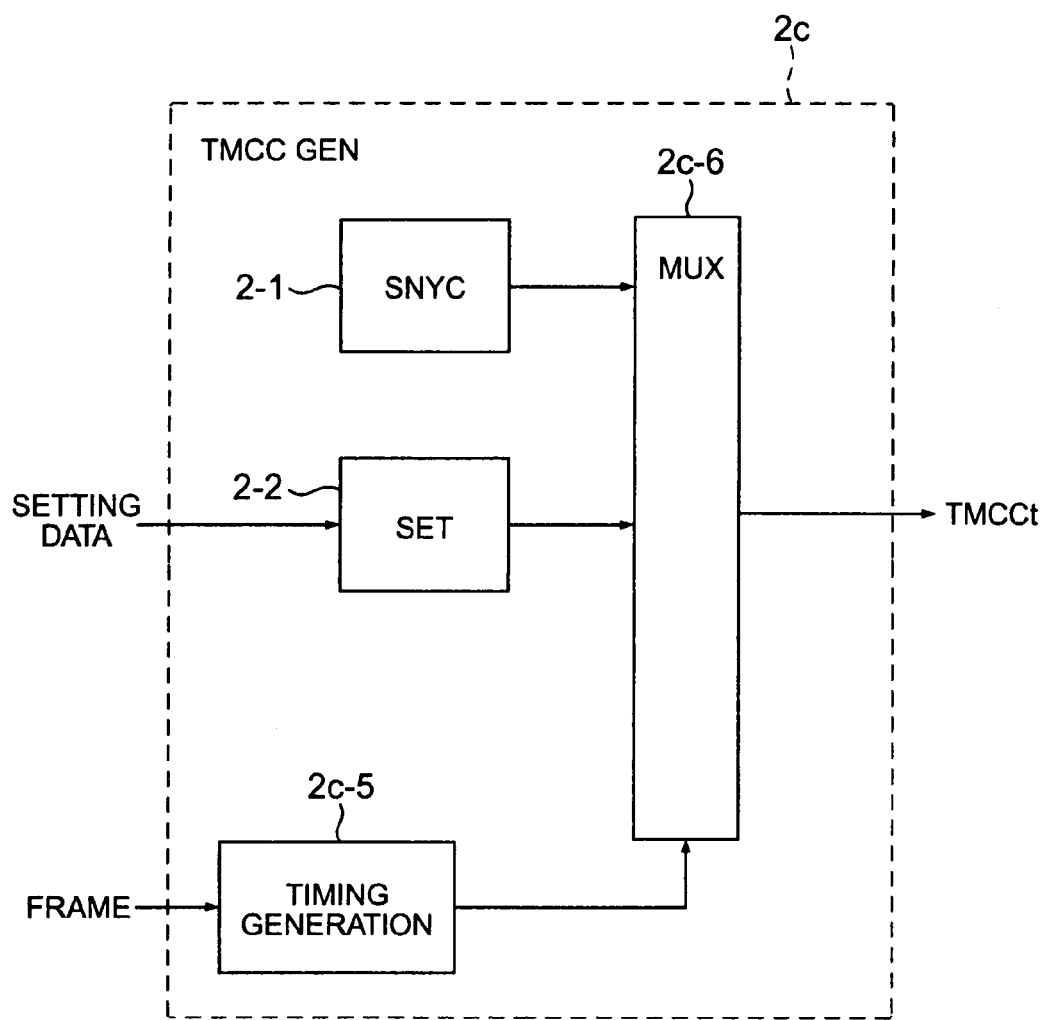
FIG. 3 is a diagram showing a configuration of the TMCC generator shown in FIG. 1.

FIG. 3 shows a configuration of the TMCC generator 2c of FIG. 1.

The frame generator 2-5 shown in FIG. 25 is replaced by a timing generator 2c-5 having the frame reset function. The timing generator 2c-5 having the frame reset function outputs a timing pulse in synchronism with the input frame signal. In accordance with this signal, the MUX 2c-6 outputs the input SYNC code and the setting information at the timing of the frame signal.

Returning to FIG. 1, in synchronism with the frame signal, the main data modulator 1 operates in such a manner that the mark B8h of the input data Dts subjected to SCL is modulated and assigned to the first symbol and the first carrier of the output data Dt.

In FIG. 22, in accordance with the timing determined indifferently or independently from the data Dts by the TMCC generator 2, the main data modulator 1 picks up the input data Dts of 188 words (d0 to d187) and generates and adds the parity of 16 words (p0 to p17) to the data Dts of d0 to d187. Thus, a total of 204 words of data including d0 to d187 and p0 to p17 are output.

Then, the parity of 16 words (p18 to p35) are added similarly to the following input data Dts (d188 to d375). Thus, a total of 204 words of data including d188 to d375 and p18 to p35 are output.

These data are mapped as data Dt through the coder 1-3. The data d0 is output at the time point t when the frame pulse is input.

The data Dt output from the main data modulator 1 are input to the integrator 3, and sequentially input to the IFFT unit 3-2. By way of explanation, assume that the number of the data carriers is 7, TMCC is one, the CP carriers are 2 and the modulation mode is 16-QAM of four bits.

The IFFT unit 3-2 selects the data of four bits input at time point t through the SEL/CP inserter 3-1, and makes information for determining the first carrier of the mth symbol. The data of four bits input and selected at time point t+1 make up information for determining the second carrier of the mth symbol. The data of four bits input and selected at time point t+2 make up information for determining the third carrier of the mth symbol. The CP input and selected at time point t+3 makes up information for determining the fourth carrier of the mth symbol. In this way, the TMCC data of the first bit input and selected at time point t+5 makes up information for determining the sixth carrier of the mth symbol. A similar process is repeated, and upon complete assignment of information for ten carriers, the IFFT process is performed to generate a time waveform of the mth symbol.

In the IFFT unit 3-2, the data of four bits input and selected at time point t+10 makes up information for determining the first carrier of the (m+1)th symbol. The data of four bits input and selected at time point t+11 make up information for determining the second carrier of the (m+1)th symbol. The data of four bits input and selected at time point t+12 make up information for determining the third carrier of the (m+1)th symbol. The CP inserted as a pilot at time point t+13 makes up information for determining the fourth carrier of the (m+1)th symbol. In this way, the TMCC data of the first bit input and selected at time point t+15 makes up information for determining the sixth carrier of the (m+1)th symbol. A similar process is repeated, and upon complete assignment of information for ten carriers, the IFFT process is performed to generate a temporal waveform of the (m+1)th symbol.

The main data modulator 1 and the integrator 3 are supplied with the same frame pulse, and the data d0 is assigned to determine the first carrier of the mth symbol.

In FIG. 22, the SCL unit 7, the main data modulator 1 and the integrator 3 are operated at different timings, and the position of B8h in Data is not determined.

In FIG. 1, the SCL unit 7, the main data modulator 1 and the integrator 3 operate by determining the timing with the same frame pulse. This frame pulse is generated based on the position of B8h existing in Data. The main data modulator 1 operating based on the frame pulse cuts out 188 words according to the position of B8h.

As a result, the subsequent process is operatively interlocked with the timing of the signal B8h. In the integrator 3, the output Dt containing B8h makes up the first symbol, thereby generating a temporal waveform with the first symbol containing the TMCC signal of the first bit corresponding to the interval of the TMCCt signal. Specifically, the modulation process is performed with the output Dt containing B8h coinciding with the starting point of the TMCC signal.

In this way, a modulation wave is generated through the integrator 3 in such a manner that the first symbol of the output Dt modulated coincides with the interval or break position of the TMCC signal (FIG. 2).

The IFt signal generated in the integrator 3 is sent to the transmission high-frequency unit 11t and changed in frequency to a microwave signal, and after being power amplified, transmitted as a radio wave from an antenna 12t.

The radio wave that has reached a receiving antenna 12r of the receiving apparatus at the receiving end through the transmission path is input to the receiving high-frequency unit 11r, and converted into the intermediate frequency signal IFr of 130 MHz-band. This signal IFr is input to the separator 4.

The separator 4, the main data modulator 5 and the TMCC regenerator 6 are the same as those shown in FIG. 22.

The frame signal output from the TMCC regenerator 6 is input to the frame reference synchronous 8TS generator 10 (hereinafter referred to as the synchronous 8TS generator). The 8TS-ST signal from the synchronous 8TS generator 10 is input to the PN generator with reset 8-4 and the 47 substitute unit 8-5 in the inverse SCL unit 8e.

The synchronous 8TS generator 10 determines the period of generating the 8TS pulse from the setting data based on the frame signal, and outputs the 8TS-ST pulse in synchronism with the timing of the frame signal.

The PN generator with reset 8-4 initializes the generated PN pattern in accordance with the 8TS-ST pulse and thus performs the process inverse to that of the SCL unit 7 at the transmitting end. The 47 substitution unit 8-5 restores the B8h substituted as a mark to the original 47h also in accordance with the 8TS-ST pulse and thus to the original data input to the SCL unit 7 at the transmitting end.

In the example shown in FIG. 22, the B8h code is searched for, which exists at regular intervals of time in the data Drs with the error not corrected. The B8h code is not a unique code but exists irregularly in the data Drs. In the case where the data Drs contains an error, therefore, the code which should originally be B8h assumes an illegal character of B0h by error, thereby sometime making it difficult to perform a specific phase processing. In contrast, B9h which is not a code indicating the start may assume an illegal character of B8h to disturb the specification processing. In other words, depending on error conditions, there may be increased cases in which B8h cannot be specified rapidly.

The inverse SCL can specify the B8h position correctly, and as long as the inverse SCL is carried out correctly, the data having about 1% error still has an error rate of about 1% after the inverse SCL. In the case where the B8h position is erroneously specified and the inverse SCL is carried out with an erroneous phase, however, the data obtained becomes totally incorrect. In that case, the error rate of the data reaches about 100%.

The TMCCr carrier is modulated by BPSK or DBPSK modulation, and as compared with 64-QAM or 16-QAM which is the modulation for the main data, can be transmitted even under the condition 10 to 20 dB more unfavorable. For this reason, in the case where B8h position is detected using TMCCr as in this invention, the correct inverse SCL can be carried out even when the data Drs obtained from the main data system is full of errors.

The correct inverse SCL is important as it affects the subsequent processing. In the actual process, the error correction process is often added before or after the inverse SCL process. The error correction requires a corresponding error ratio which is normally not more than several %. The erroneous inverse SCL leads to the error ratio of almost 100% and cannot be expected to produce the effect of error correction at all.

Figure 4:
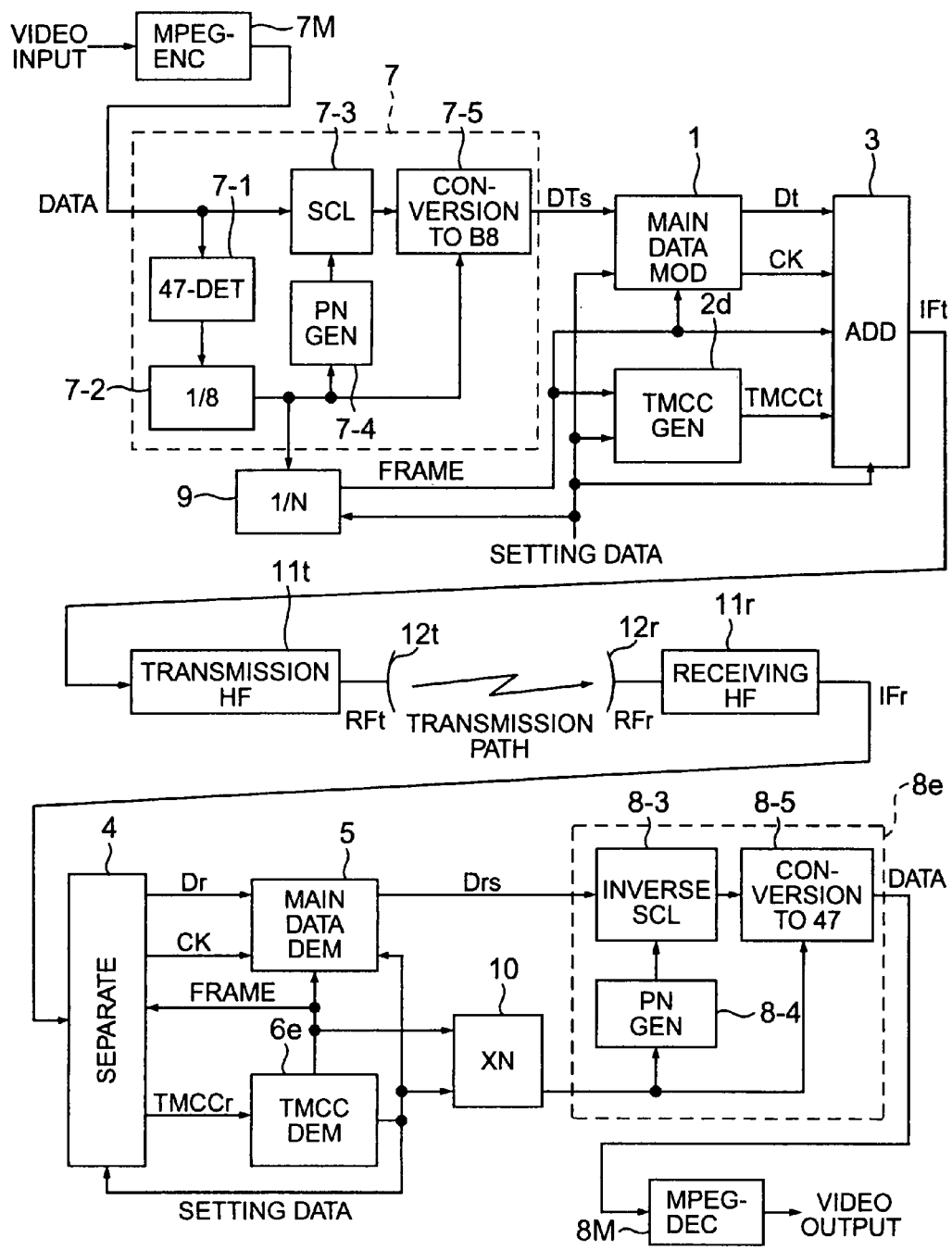
FIG. 4 is a diagram showing a general configuration of a transmitting system according to a second embodiment of the invention.

FIG. 4 shows a general configuration of the transmitting system according to a second embodiment of the invention.

In FIG. 4, the same component parts as those in FIG. 1 are designated by the same reference numerals, respectively. The TMCC generator in FIG. 1 is replaced by a TMCC generator 2d having the function of inserting a sub-SYNC, and the TMCC demodulator is replaced by a TMCC demodulator 6e having the function corresponding to the sub-SYNC.

Figure 5:
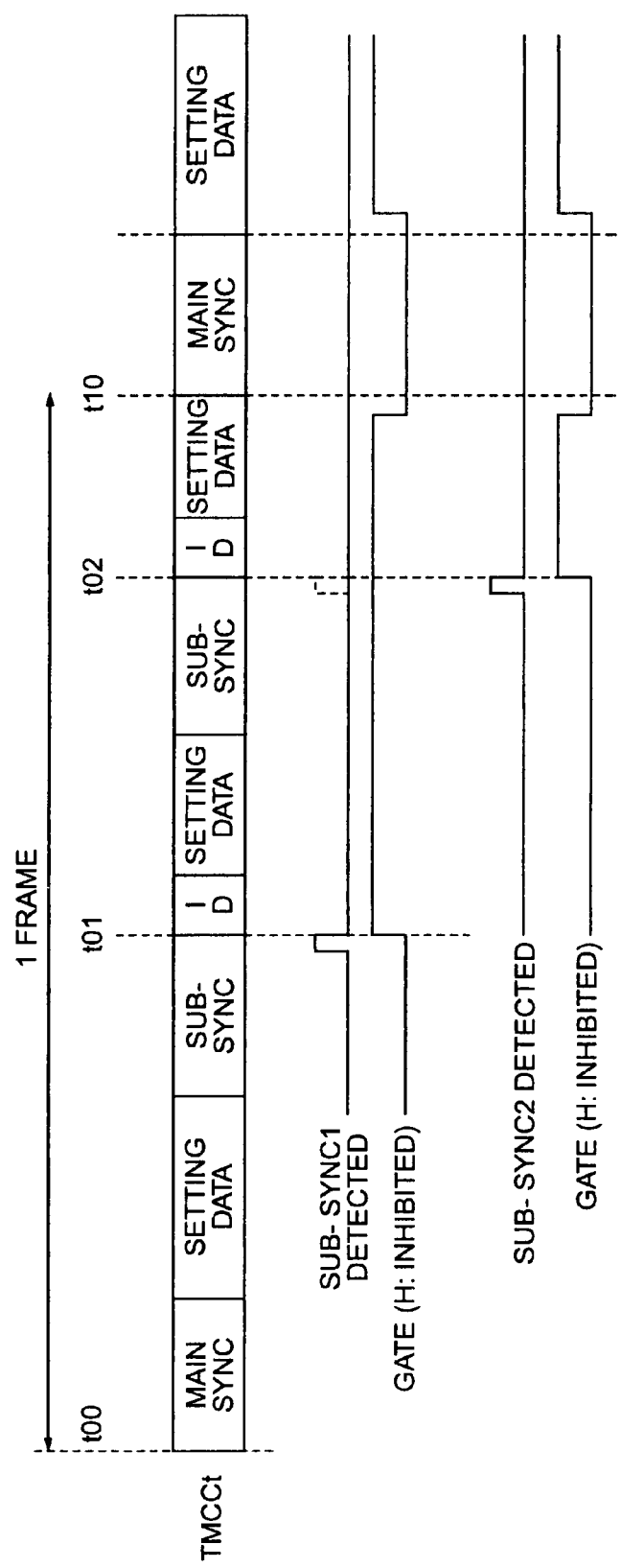
FIG. 5 is a diagram showing TMCCt, etc. inserted in an ancillary SYNC.

FIG. 5 shows the carrier TMCCt, etc. with the sub-SYNC inserted therein.

In FIG. 5, two signals including the sub-SYNC and an ID paired therewith are inserted between the setting data in addition to the first main SYNC of each frame.

Assume that one frame period lasts from time point t00 to time point t10. The main SYNC composed of 16 bits of 35 EEh, for example, is started from t00. The first sub-SYNC is arranged in the vicinity of time point t01, followed immediately by the ID information indicating the first in order. Also, the second sub-SYNC is arranged in the vicinity of time point t02, followed immediately by the ID information indicating the second in order.

Figure 6:
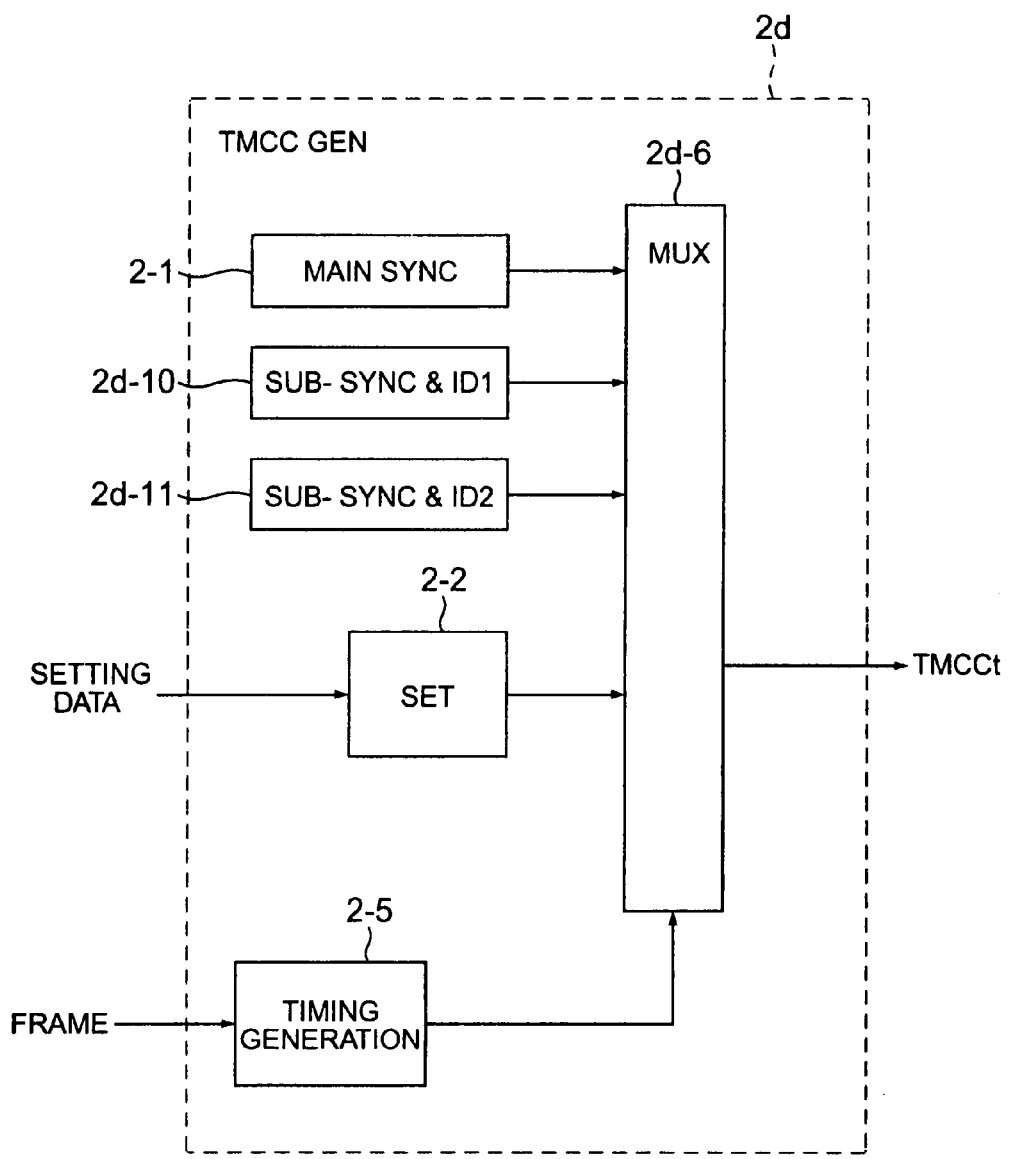
FIG. 6 is a diagram showing a configuration of a TMCC generator having the function to insert the ancillary SYNC pattern of FIG. 4.

FIG. 6 shows a configuration of the TMCC generator 2d having the function of inserting the sub-SYNC of FIG. 4.

A sub-SYNC & ID1 (2d-10) for generating the first sub-SYNC and ID1 and a sub-SYNC & ID2 (2d-11) for generating the second sub-SYNC and ID are provided, and the output thereof is input to MUX 2d-6 having an increased number of inputs selected. In accordance with the control signal from the timing generator 2-5, MUX 2d-6 selects and outputs the main SYNC, the setting information and the sub-SYNC in that order at time point t00, ID1, the setting information and the sub-SYNC in that order at time point t01, and ID2 and the setting information in that order at time point t02.

Figure 7:
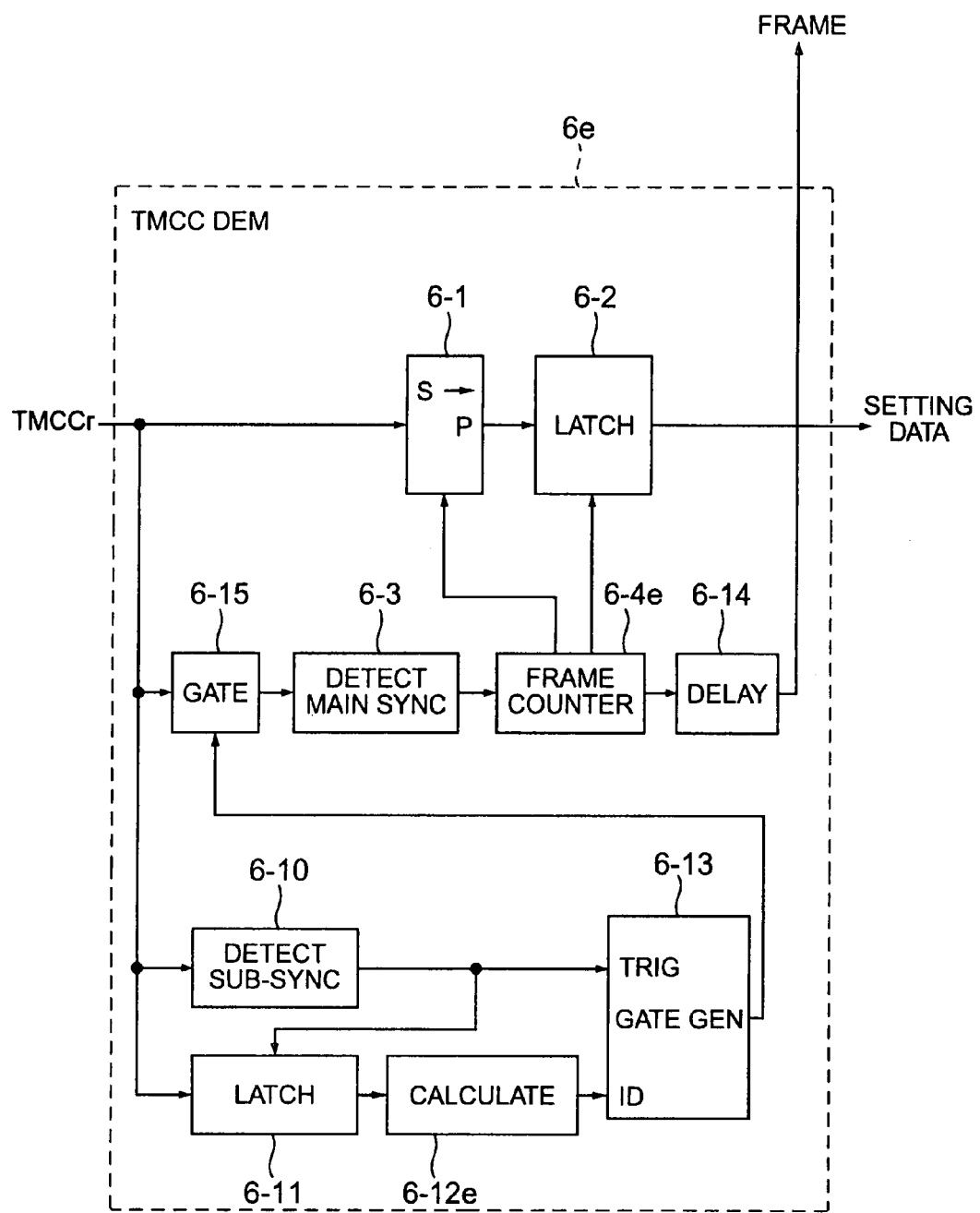
FIG. 7 is a diagram showing a configuration of a TMCC regenerator having the function corresponding to the ancillary SYNC pattern of FIG. 4.

FIG. 7 shows a configuration of the TMCC regenerator 6e having the function corresponding to the sub-SYNC of FIG. 4. The input signal TMCCr is input to a serial/parallel converter 6-1, a gate 6-15, an sub-SYNC detector 6-10 and a latch 6-11. The output of the gate 6-15 is input to the main SYNC detector 6-3. The output of the sub-SYNC detector 6-10 is input to the control terminal of the latch 6-11 and the Trig terminal of a gate generator 6-13. The output of the latch 6-11 is input to a calculator 6-12e. The output of the calculator 6-12e is input to the ID terminal of the gate generator 6-13. The output of the gate generator 6-13 is input to the control terminal of a gate 6-15.

Now, the operation will be explained with reference to FIG. 7.

The gate 6-15 allows the input signal thereof to pass therethrough in the case where the control terminal is L-level, and cuts off the input signal in the case where the control terminal is H-level.

The latch 6-11 fetches the ID information following the sub-SYNC in response to the output of the sub-SYNC detector 6-10.

The operation related to the gate generator 6-13 will be explained with reference to FIGS. 5 and 7.

Before time point t01 when the sub-SYNC is not detected, the output of the gate generator 6-13 assumes level L and the gate 6-15 passes all the inputs thereto. At time point t01, the output of the gate generator 6-13 switches to level H in response to the output detected with the sub-SYNC1. At the same time, the latch 6-11 fetches ID. The calculator 6-12e outputs the estimated time during which the main SYNC may exist in accordance with the ID value. In the case where the sub-SYNC1 is detected at time point t01, the 2/3 frame time (about t10-t01) is output. As a result, the output of the gate generator 6-13 assumes level L from immediately before the time point t10 which is 2/3 frame after time point 01.

In the case where the sub-SYNC1 is overlooked and the sub-SYNC2 is detected, the calculator 6-12e outputs the time (about t10-t02) of the 1/3 frame period in accordance with the ID value. As a result, the output of the gate generator 6-13 comes to assume level L from immediately before time point t10, i.e. 1/3 frame after time point t02.

According to this second embodiment, in addition to the effect of the first embodiment, the main SYNC of the next frame can be found using the sub-SYNC1 or SYNC2.

Figure 8:
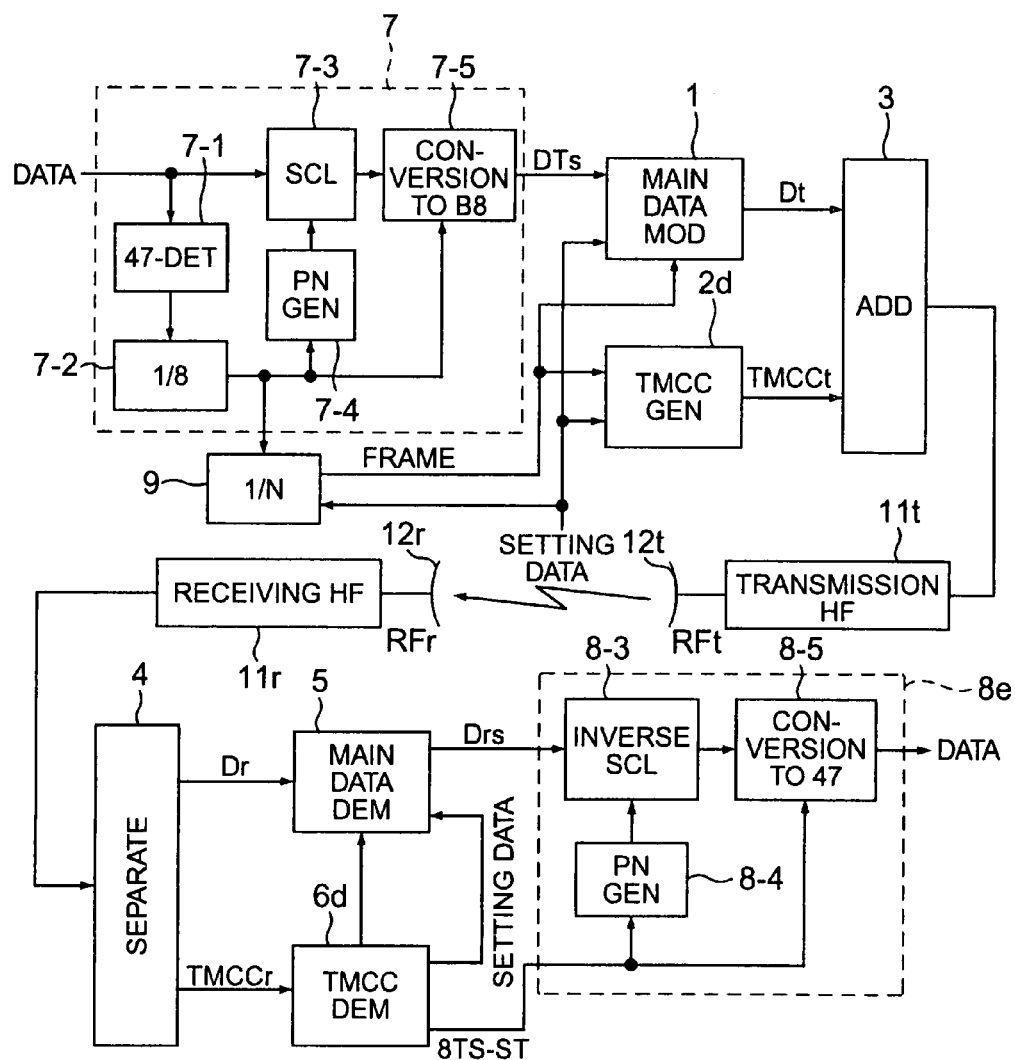
FIG. 8 is a diagram showing a general configuration of a transmitting system according to a third embodiment of the invention.

FIG. 8 shows a general configuration of the transmitting system according to a third embodiment of the invention.

In FIG. 8, the same component parts as those in FIG. 4 are designated by the same reference numerals, respectively. The TMCC regenerator 6e having the functions corresponding to those of the sub-SYNC is designated as 6d.

Figure 10:
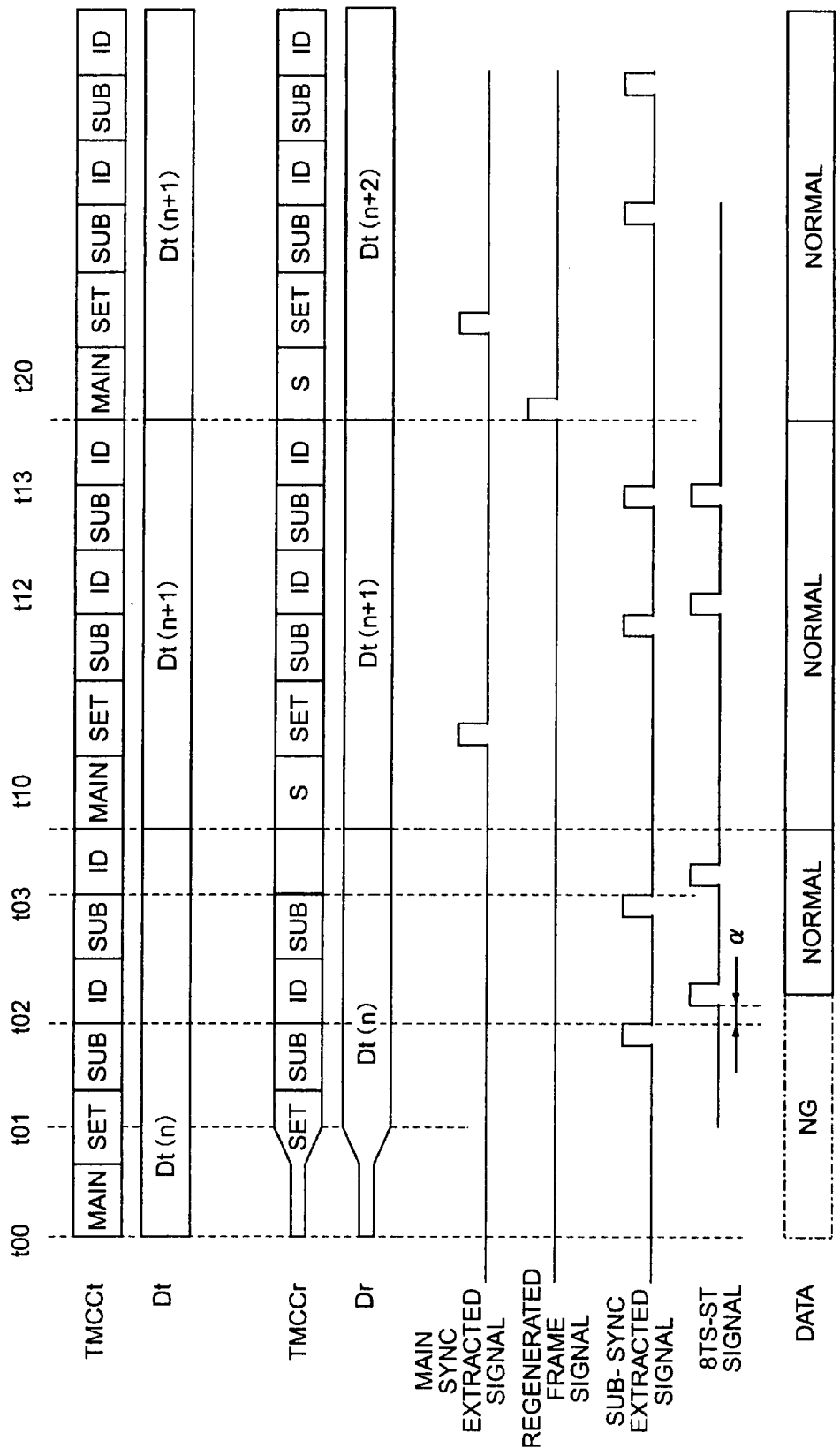
FIG. 10 is a diagram showing the operation related to the 8TS generator shown in FIG. 8.

In synchronism with the frame signal, the TMCC generator 2d generates the TMCCt signal as shown in FIG. 10. While this TMCCt signal is shown to have arranged therein two pairs of the sub-SYNC and the ID thereof following the main SYNC and the setting data, but at least one pair may suffice instead of two.

The receiving apparatus at the receiving end inputs the frame signal output of the TMCC generator 6d to the main data demodulator 5. The 8TS-ST signal output of the TMCC regenerator 6d is input to the PN generator with reset 8-4 and the 47 substitution unit 8-5 in the inverse SCL unit 8e.

Figure 9:
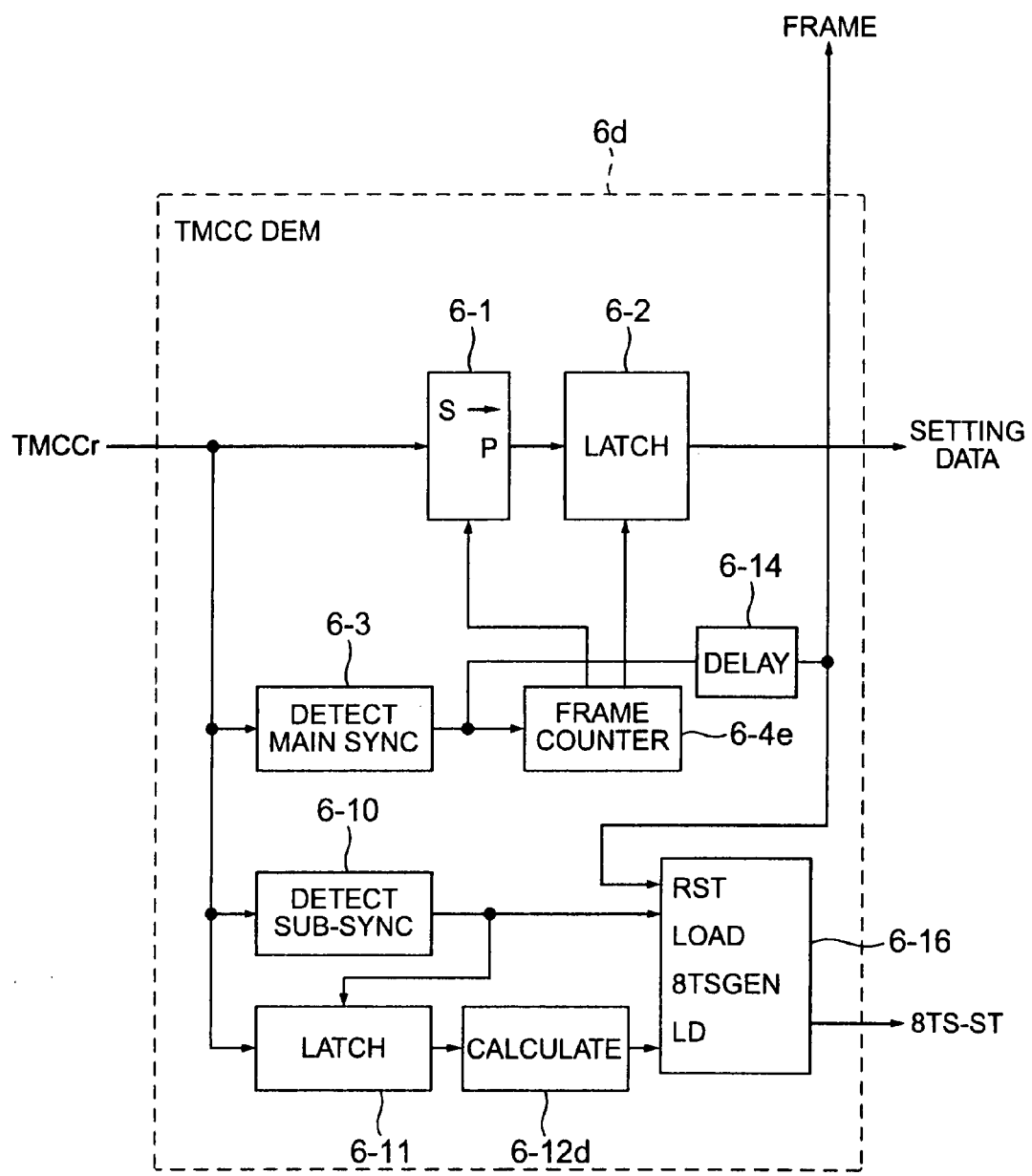
FIG. 9 is a diagram showing a configuration of a TMCC regenerator having the function corresponding to the ancillary SYNC pattern of FIG. 8.

FIG. 9 shows a configuration of the TMCC regenerator 6d having the function corresponding to that of the sub-SYNC of FIG. 8. The input signal TMCCr is connected to the serial/parallel converter 6-1, the sub-SYNC detector 6-10 and the latch 6-11. The output of the sub-SYNC detector 6-10 is input to the control terminal of the latch 6-11 and the LOAD terminal of the 8TS generator 6-16 at the same time. The main SYNC extraction signal is input through the delay unit 6-14 to the RST terminal of the 8TS generator 6-16. The output of the latch 6-11 is input to the calculator 6-12d. The output of the calculator 6-12d is input to the LD terminal of the 8TS generator 6-16. The output of the 8TS generator 6-16 constitutes the 8TS-ST signal.

Now, the operation will be explained.

The latch 6-11 fetches the ID data following the sub-SYNC in response to the output of the sub-SYNC detector 6-10.

When the RST terminal rises to high level H, the 8TS generator 6-16 initializes the counter value in synchronism with the edge timing thereof and repeatedly outputs the 8TS-ST signal for each 13056 bits.

When the LOAD terminal rises to high level H, on the other hand, the 8TS generator 6-16 sets the counter value to the value that has so far been applied to the LD terminal, and then repeatedly outputs the 8TS-ST signal for each 13056 bits.

The operation related to the 8TS generator 6-16 shown in FIG. 9 will be explained with reference to FIG. 10.

Assume that the condition of the transmission path has restored to normal at about time point t01.

At time point t02, the sub-SYNC is detected and the extraction signal appears. In accordance with the value of the calculator 6-12d, the 8TS generator 6-16 is set ready for producing the 8TS-ST signal at time point t02+α. When the time point t02+α is reached, the 8TS-ST signal is output. As a result, in the inverse SCL unit 8e, the PN generator 8-4 is initialized, and the data Data is restored to normal state at time point t02+α.

According to this embodiment, the mark position for carrying out inverse SCL can be specified uniquely from the result of demodulation of the TMCC at the time of demodulation of the TMCC without searching for a specific bit such as B8h. Also, it becomes easy to detect the TMCC starting point at the time of demodulation of TMCC. Further, the inverse scramble operation becomes possible midway of the frame. In addition, the process can be executed rapidly without waiting for the next frame interval. Furthermore, upon restoration from the disconnected transmission state, the inverse scramble process can be resumed at an early time.

Figure 11:
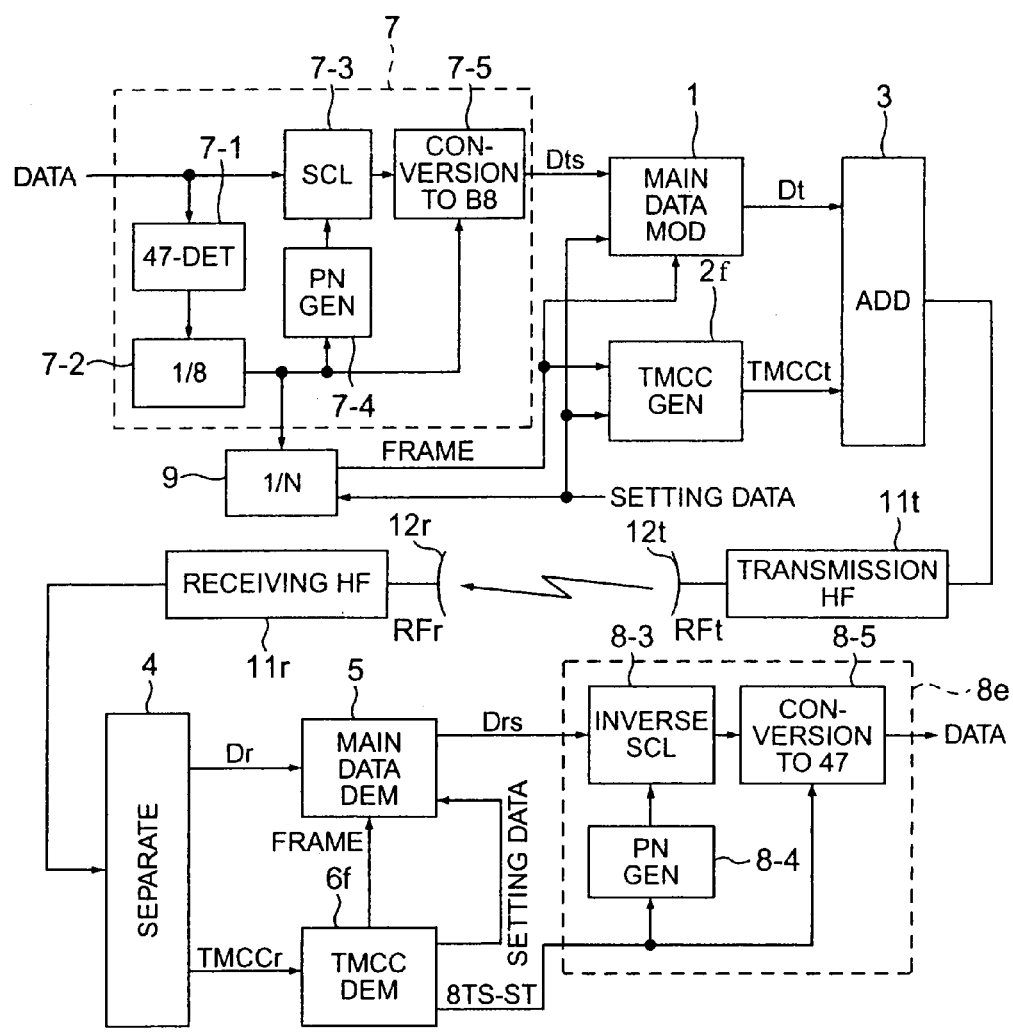
FIG. 11 is a diagram showing a general configuration of the transmitting system according to a fourth embodiment of the invention.

FIG. 11 shows a general configuration of the transmitting system according to a fourth embodiment of the invention.

In FIG. 11, the same component parts as those in FIG. 8 are designated by the same reference numerals, respectively. The TMCC generator 2d is designated as 2f, and the TMCC regenerator 6d as 6f.

Figure 12:
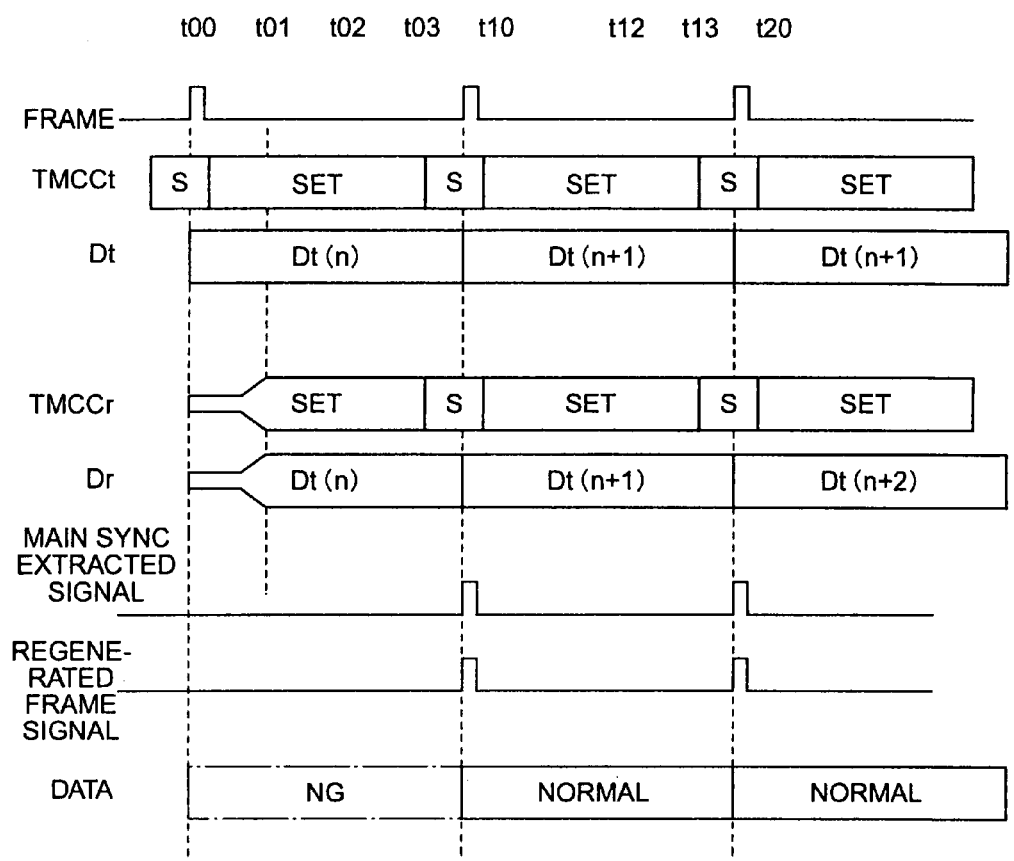
FIG. 12 is a diagram showing the signal processing in FIG. 11.

FIG. 12 shows the signal processing in FIG. 11. In FIG. 12, the sub-SYNC and ID are not shown to facilitate a better understanding.

The TMCCt signal is advanced ahead of the Dt signal. Specifically, the ending point of the SYNC word is rendered to coincide with the starting point of the Dt signal.

Assume that the transmission condition is restored at time point t01. The SYNC corresponding to Dt(n) cannot of course be detected. The SYNC corresponding to Dt(n+1) begins to appear from time point t03. At time point t10, the main SYNC extraction signal is generated. This extraction signal is used directly as a regeneration frame signal. Specifically, at the time point when the main SYNC extraction signal is generated, the head of the Dt signal is set, and therefore the main data demodulator 5 immediately starts normal operation before time t20 when the next frame begins.

Figure 13:
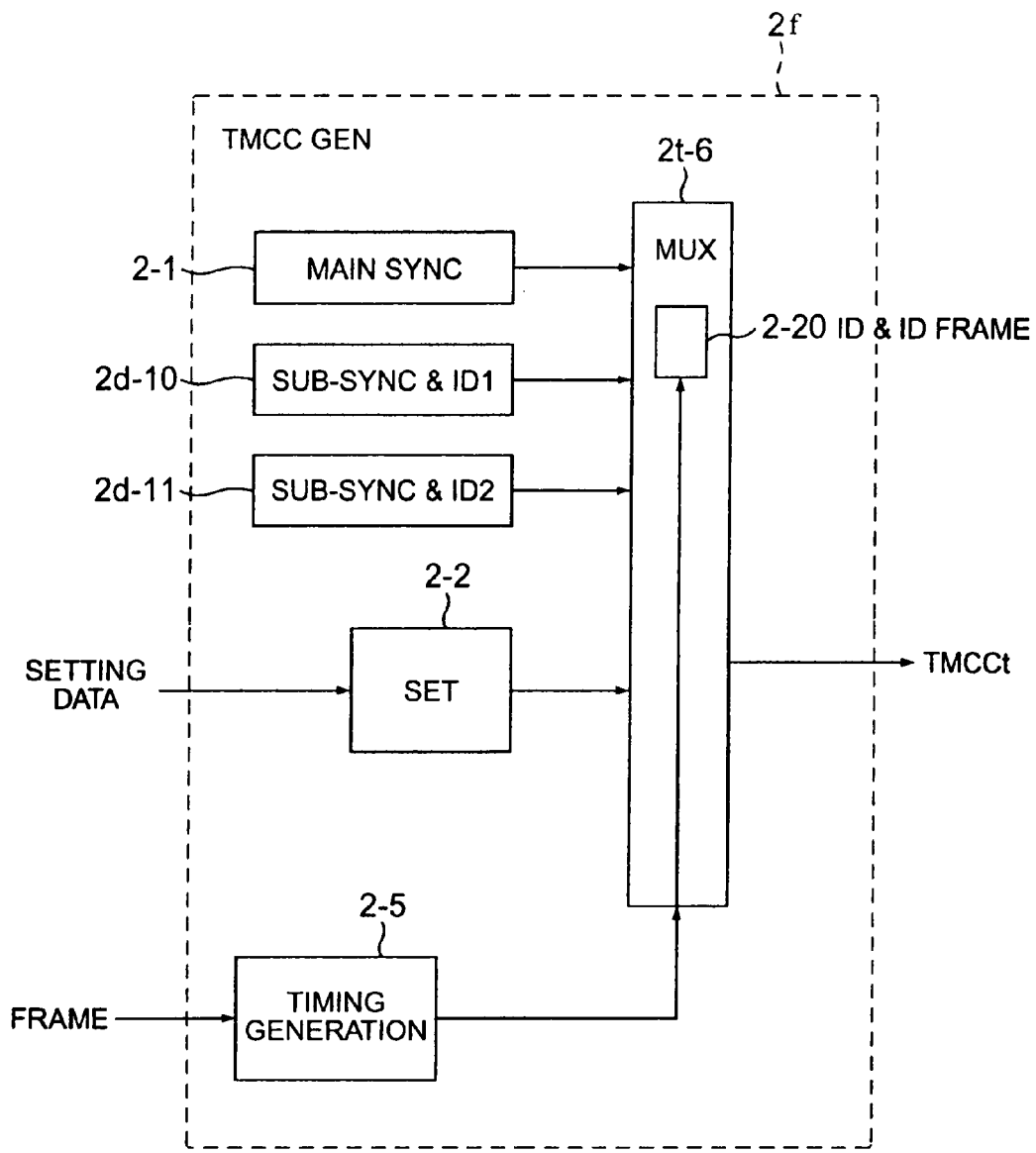
FIG. 13 is a diagram showing a configuration of the TMCC generator of FIG. 11.

FIG. 13 shows a configuration of the TMCC generator 2f in FIG. 11. This configuration is identical to that of FIG. 6 except that an ID and frame ID generator 2-20 described later is added. Thus, the operation timing is different, and as described above, the ending point of the SYNC word is rendered to coincide with the starting point of the Dt signal.

Figure 14:
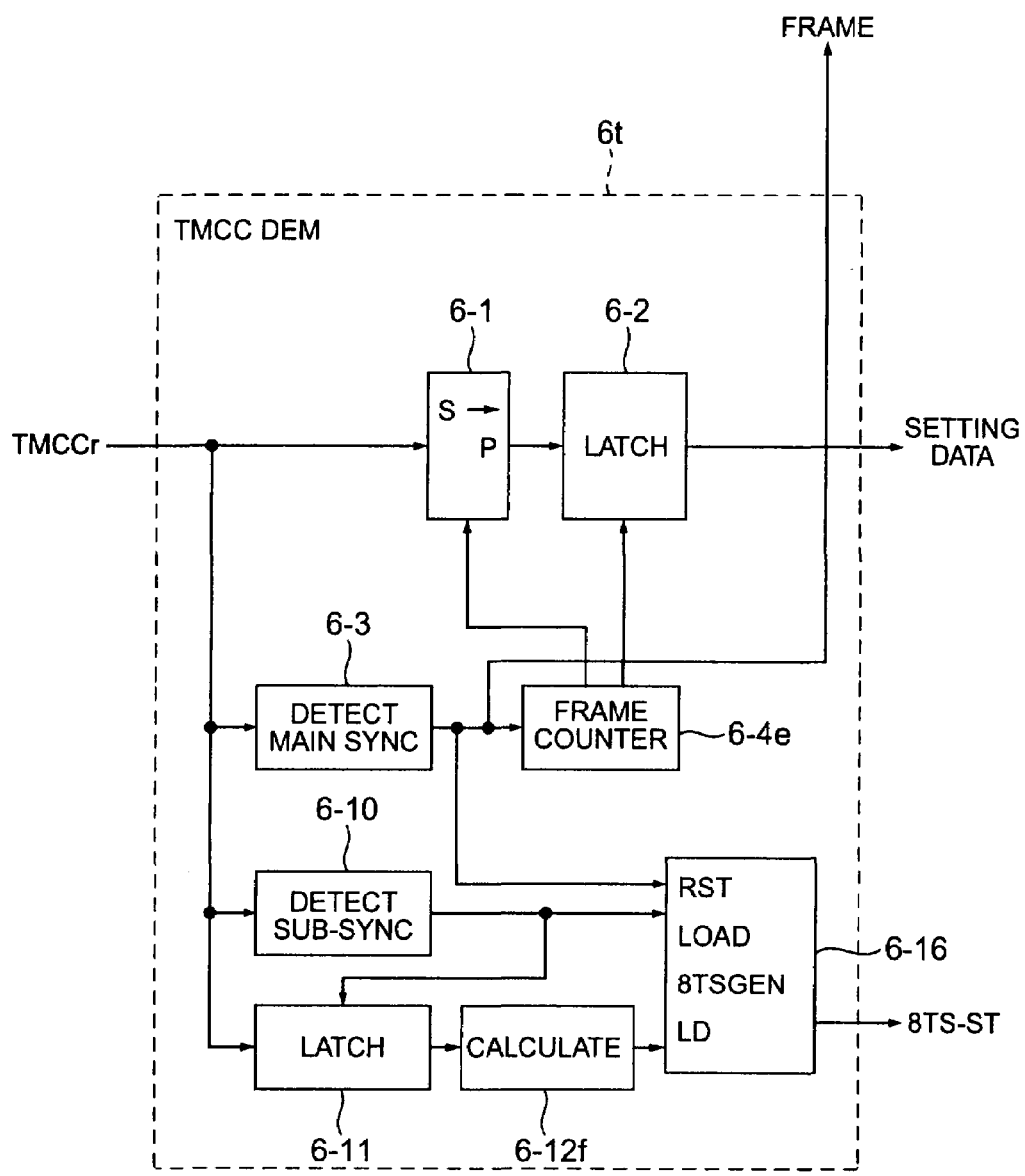
FIG. 14 is a diagram showing a configuration of the TMCC regenerator of FIG. 11.

FIG. 14 shows a configuration of the TMCC regenerator 6f of FIG. 11. The extraction output of the main SYNC detector 6-3 is directly output as a frame signal on the one hand and input to the RST terminal of the 8TS generator 6-16 on the other hand. The value corrected by the phase advance is written in the calculator 6-12f beforehand.

Figure 15:
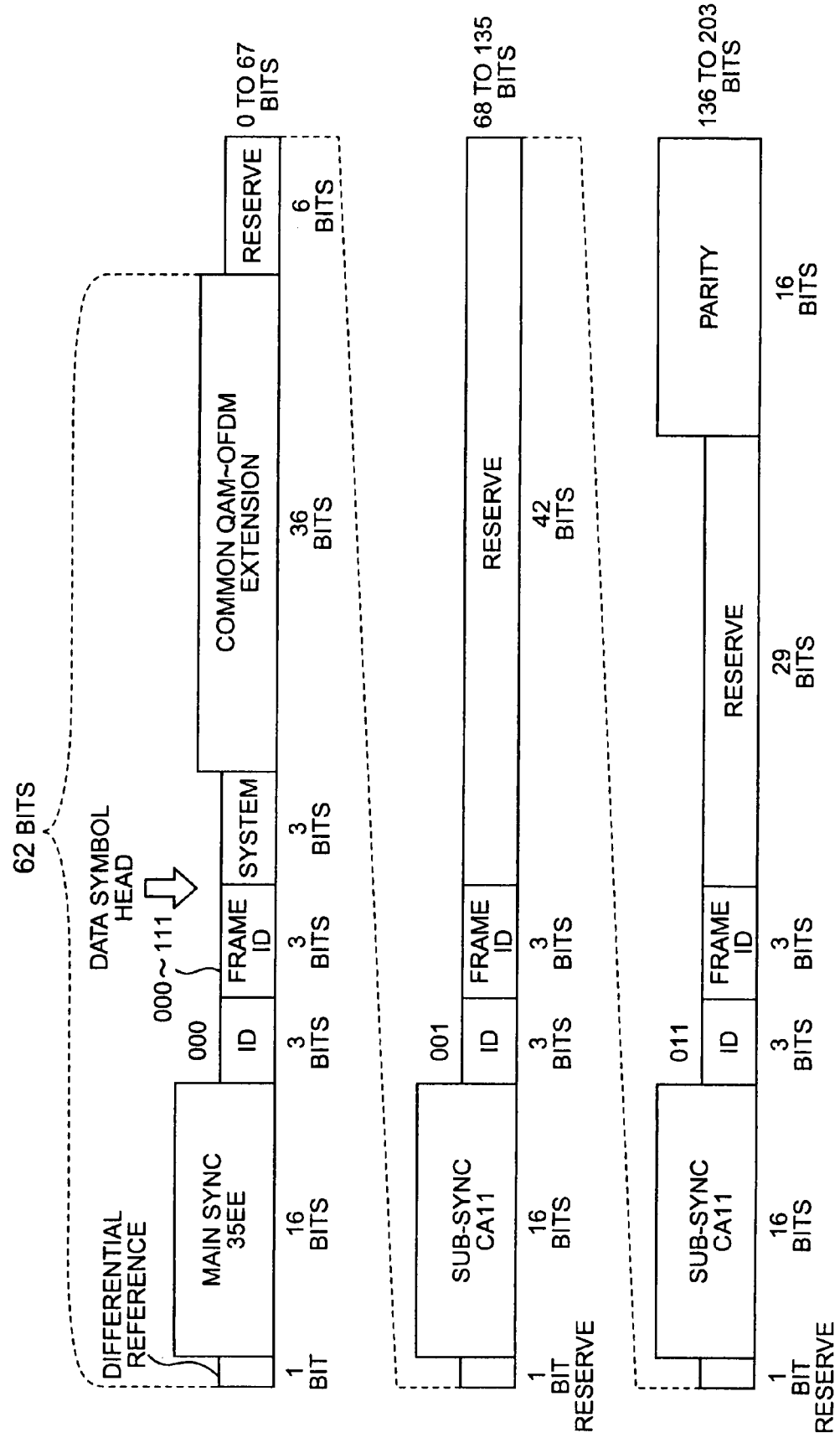
FIG. 15 is a diagram showing a frame of the TMCC signal containing an actual ancillary SYNC pattern.

FIG. 15 shows one frame of the TMCC signal containing the actual sub-SYNC.

After the main SYNC, the ID, the frame ID and the "system" are inserted, followed by the common QAM and the extension OFDM code for indicating the setting data.

The ID is used for discriminating the main SYNC, the first sub-SYNC and the secondary sub-SYNC. Thus, these particular three types are represented as 000, 001 and 011, respectively.

In view of the fact that a superframe is configured of eight frames, the frame ID is indicated by 000 to 011 representing one of eight types.

The "system" is a code indicating the version of the TMCC used by the system according to this invention, and constituted of 3 bits adapted to indicate eight times of version upgrading.

The ID, the frame ID and the reserve code are inserted after the first sub-SYNC and the second sub-SYNC. The parity code is inserted at the end.

Figure 16:
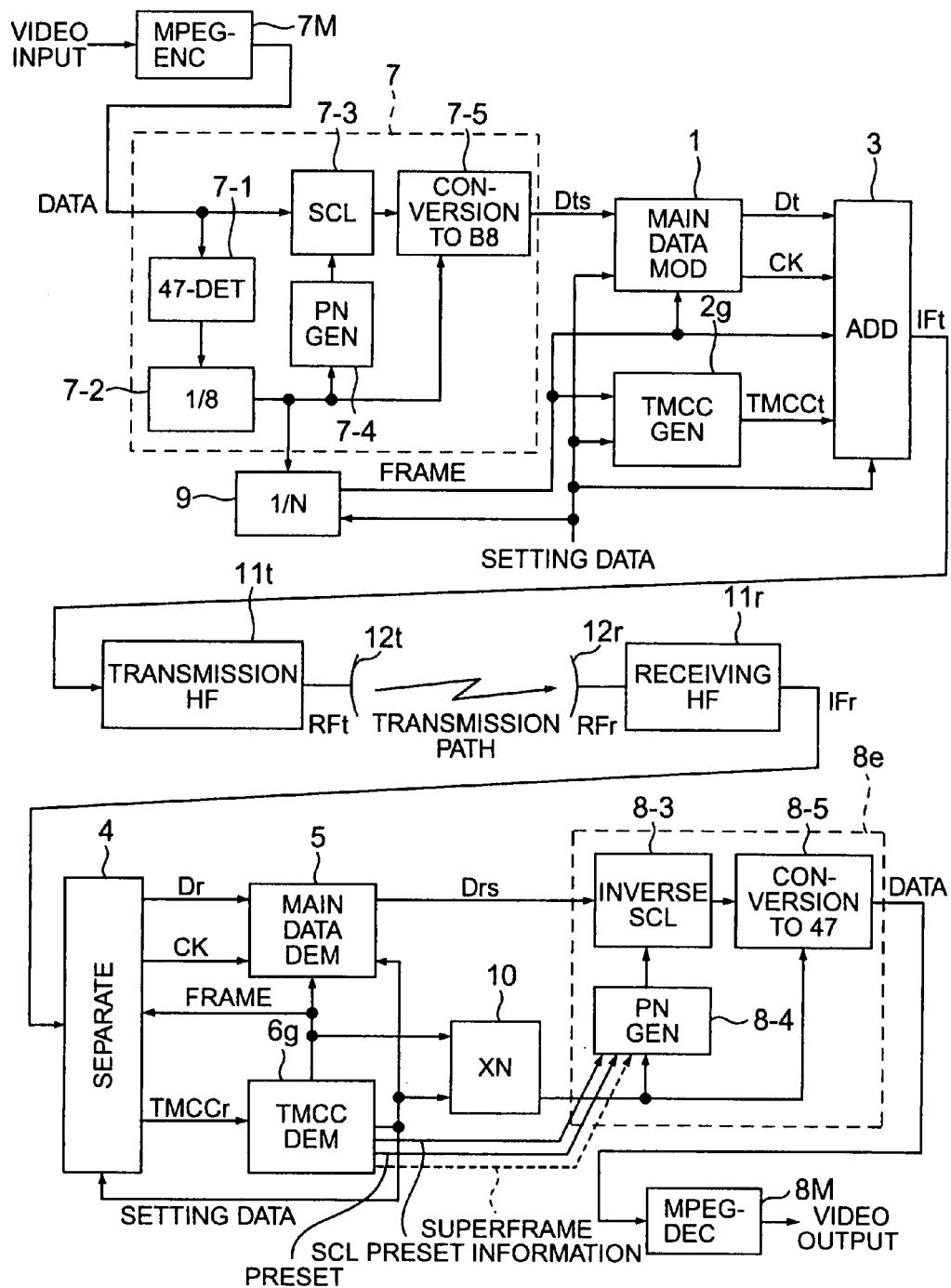
FIG. 16 is a diagram showing a general configuration of a transmitting system according to a fifth embodiment of the invention.

FIG. 16 shows a general configuration of the transmitting system according to a fifth embodiment of the invention.

In FIG. 16, the same component parts as those in FIG. 1 are designated by the same reference numerals, respectively. The TMCC generator 2c is designated as 2g, and the TMCC regenerator 6 as 6g.

The SCL preset information and the preset signal from the TMCC regenerator 6g are connected to the PN generator with preset 8-4.

The superframe signal from the TMCC regenerator 6g may further be applied to the PN pattern generator 8-4.

Figure 17:
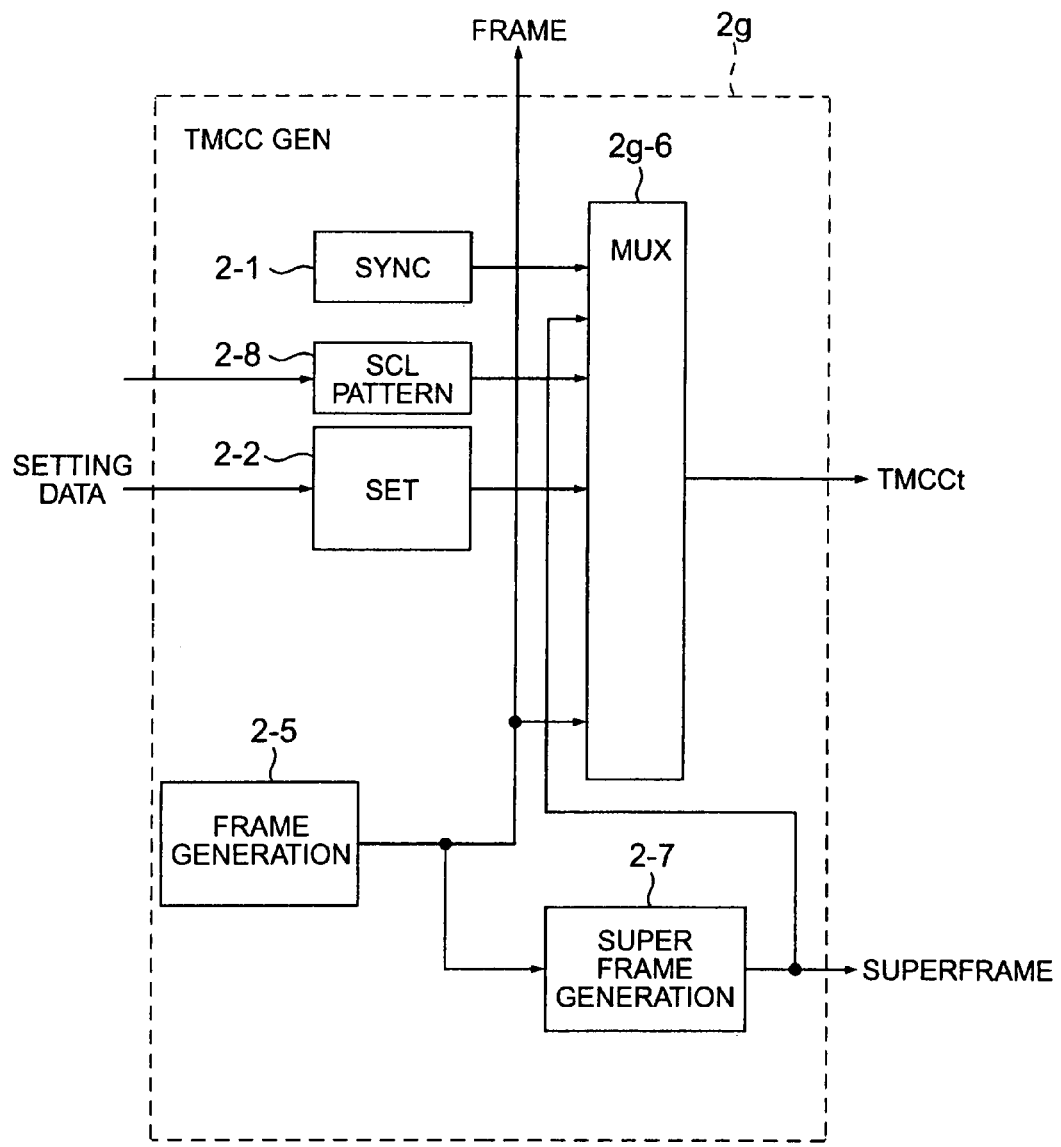
FIG. 17 is a diagram showing a configuration of the TMCC generator of FIG. 15.

FIG. 17 shows a configuration of the TMCC generator 2g of FIG. 16.

The setting mode signal or the setting data from an external source is input to the setting information generator 2-2. The frame signal from the frame generator 2-5 is input to the superframe generator 2-7 and the MUX 2g-6. The MUX 2g-6 is supplied with the outputs of the SYNC generator 2-1, the setting information generator 2-2, the SCL pattern latch 2-8 and the superframe signal generator 2-7. The SCL information is input to the SCL pattern latch 2-8. The superframe generator 2-7 is a circuit for dividing the frequency of the frame pulse by eight, for example.

The MUX 2g-6 outputs the input SYNC code, the superframe information, the SCL pattern and the setting information sequentially switched in accordance with the input frame signal.

Figure 18:
FIG. 18 is a diagram showing the TMCC pattern generated by the TMCC generator of FIG. 17.

FIG. 18 shows a TMCC pattern generated by the TMCC generator 2g of FIG. 17. The SYNC code is followed by the superframe information, followed by the SCL pattern and the setting information in that order. The SCL pattern is the information indicating the preset value of the PN pattern generator 8-4 described later.

Figure 19:
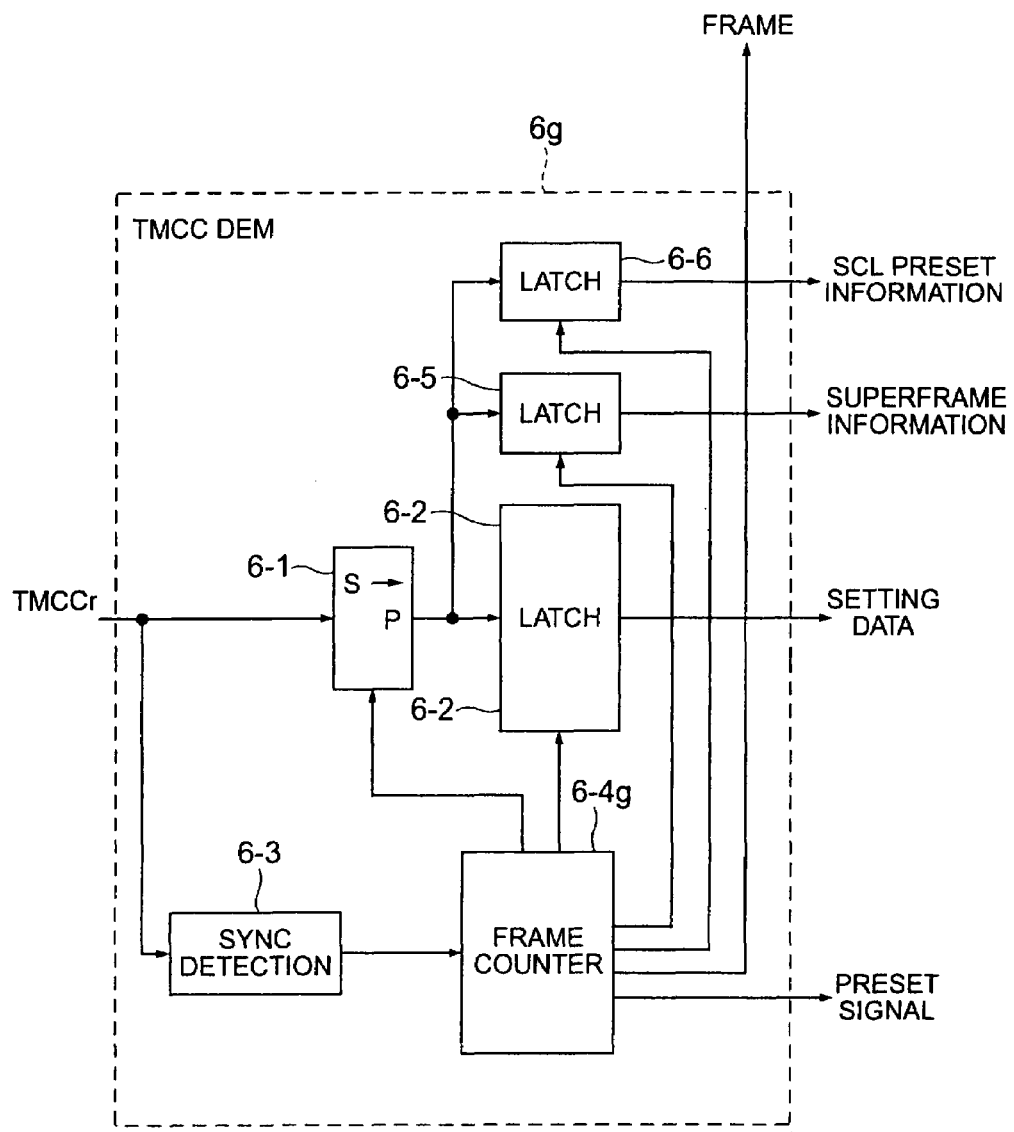
FIG. 19 is a diagram showing a configuration of the TMCC regenerator of FIG. 16.

FIG. 19 shows a configuration of the TMCC regenerator 6g of FIG. 16.

The input signal TMCCr is input to the SYNC detector 6-3 and the serial/parallel converter 6-1. The output of the SYNC detector 6-3 is input to the reset terminal of the frame counter 6-4g. From the frame counter 6-4g, the latch signal for capturing the paralleled information input to the latches 6-5, 6-6, the frame signal and the preset signal indicating the preset timing are output at predetermined timing.

The SYNC detector 6-3 detects the bit pattern of the SYNC and resets the frame counter 6-4g. From this timing, the frame counter 6-4g begins counting and extracts various information from TMCCr.

The setting information sent from the transmitting apparatus at the transmitting end is output by being captured in the latch 6-2, the bit indicating the superframe in the latch 6-5 and the SCL preset information in the latch 6-6.

Figure 20:
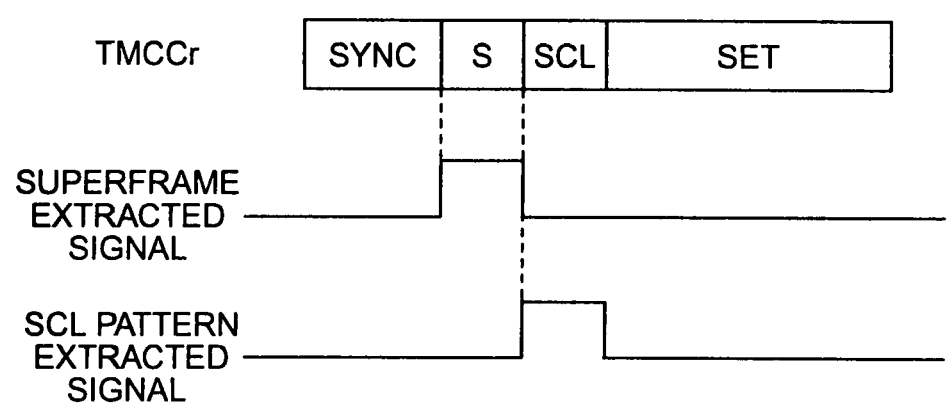
FIG. 20 is a diagram showing the relation between a TMCCr signal, an extraction signal for capturing the superframe information and an extraction signal for capturing the SCL preset information.

FIG. 20 shows the relation between the TMCCr signal, the extraction signal for capturing the superframe information and the extraction signal for capturing the SCL preset information.

Figure 21:
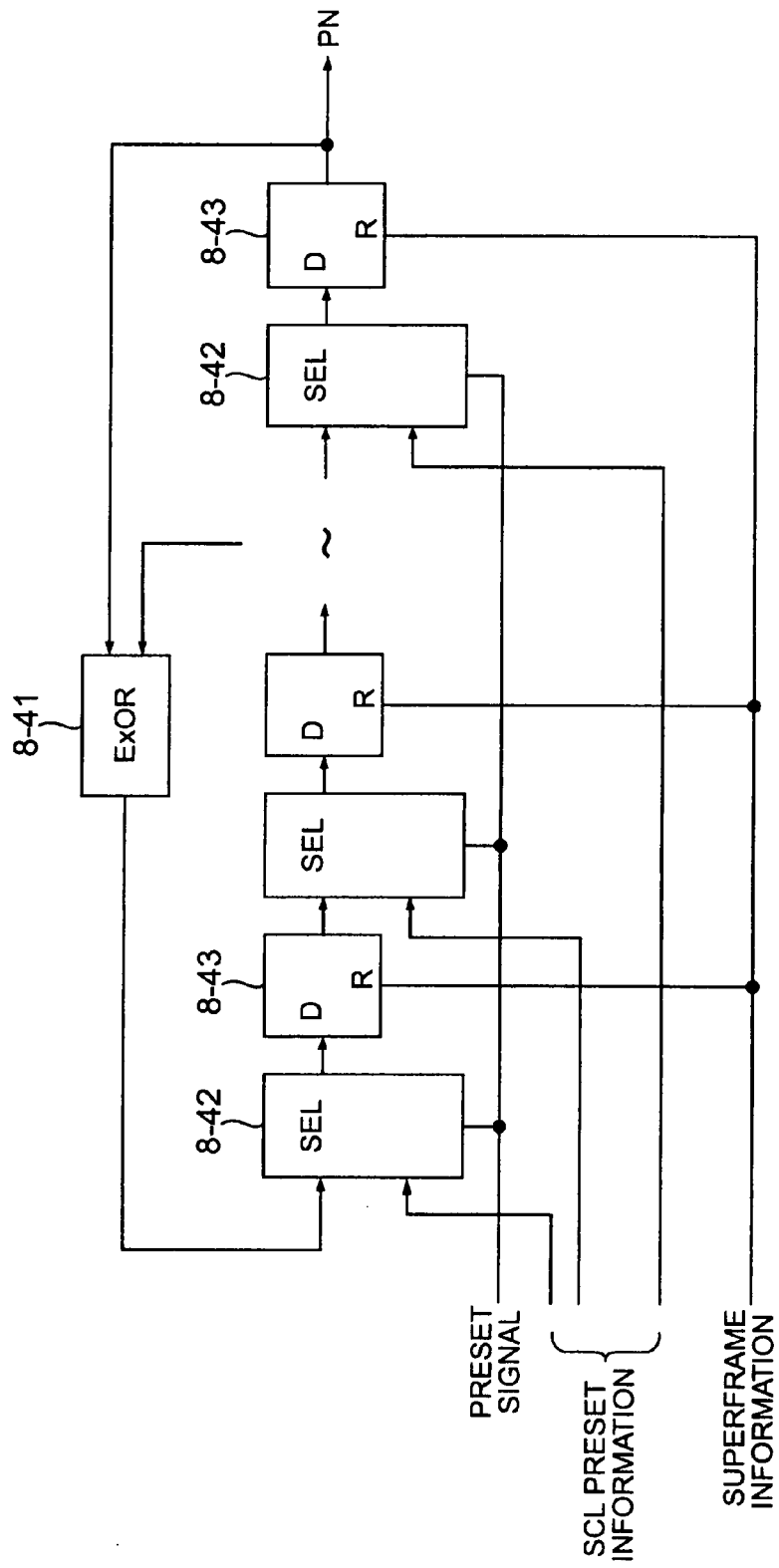
FIG. 21 is a diagram showing a configuration of the PN pattern generator with preset shown in FIG. 16.

FIG. 21 shows a configuration of the PN pattern generator with preset 8-4 of FIG. 16. In FIG. 21, numeral 8-41 designates an exclusive OR circuit, numeral 8-42 selectors and numeral 8-43 D-flip-flops.

Once the pulse of the superframe from the TMCC regenerator 6g is input to the reset terminal of each D-flip-flop 8-43, the outputs of all the D-flip-flops 8-43 are reduced to L level, and the output PN pattern is reset and initialized.

When the SCL preset information and the preset signal are input, on the other hand, the selectors 8-42 select the preset information in response to the preset signal. These preset information are applied to the D terminal of each D-flip-flop 8-43. The D-flip-flops 8-43 are thus preset.

A superframe is generated for each eight frames. Conventionally, even in the case where the normal transmission is restored from disconnection at the second frame, the inverse SCL cannot be normalized before generation of the next superframe because the PN pattern is not initialized.

According to this embodiment, in contrast, the SCL pattern inserted in the TMCC of each frame in the transmitting apparatus at the transmitting end can be produced by the receiving apparatus at the receiving end, and therefore the correct SCL can be started before the arrival of the next superframe, thereby making rapid transmission restoration possible.

In this embodiment, the mark position for performing inverse SCL can be specified uniquely from the result of demodulation of the TMCC signal at the time of TMCC demodulation without searching for a specific bit such as B8h providing a mark. Also, the TMCC starting point can be detected easily at the time of TMCC demodulation. Further, the inverse scramble process midway of the frame is made possible. Furthermore, the rapid processing can be executed without waiting for the next frame interval. In addition, at the time of restoration from a transmission disconnection, the inverse scramble process can be resumed at an early time.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A transmitting apparatus for transmitting a transmission signal including main data modulated by a designated modulation scheme and a TMCC signal having a SYNC pattern representing a header portion, at least a pair of a sub-SYNC pattern and identification information thereof, arranged between said SYNC pattern and the SYNC pattern of the next frame, and a bit pattern representing setting information indicating said modulation scheme, said apparatus comprising:

a pre-processor for pre-processing an input compressed data word string to generate pre-processed frames;

a main data modulator, operable in synchronism with said pre-processor, for generating a main data frame string by modulating said pre-processed frames N frames by N frames by said designated modulation scheme, said N being a positive integer determined by the modulation scheme and the convolutional coding rate;

a TMCC generator, operable in synchronism with the generation of each of said main data frames, for generating a corresponding TMCC signal;

an OFDM modulator connected to receive said main data frame and said corresponding TMCC signal;

a transmission high-frequency unit connected to said OFDM modulator;

a receiving high-frequency unit;

an OFDM demodulator connected to said receiving high-frequency unit for demodulating said main data frame string and the TMCC signal corresponding to each of said main data frames;

a TMCC regenerator for extracting said setting information from said demodulated TMCC signal and generating a frame signal indicating the head of each of said main data frames from selected one of said SYNC pattern and said sub-SYNC pattern and the identification information thereof in said demodulated TMCC signal;

a main data demodulator for regenerating said pre-processed frames from each of said demodulated main data frames based on said frame signal and said setting information;

a circuit for generating the head position of each of said pre-processed frames from said frame signal; and an inverse processor for processing each of said processed frames starting with the head position thereof inversely to said pre-processing thereby to regenerate said input compressed data word string.

2. A receiving apparatus according to claim 1, wherein said TMCC regenerator includes a circuit for providing an estimated SYNC pattern position of the next frame from said sub-SYNC pattern and the identification information thereof.

3. A transmitting system comprising:

a transmitting apparatus for a transmission signal including main data modulated by a designated modulation scheme and a TMCC signal having a SYNC pattern representing a header portion, a bit pattern representing setting information indicating said modulation scheme and at least a pair of a sub-SYNC pattern and identification information thereof arranged between said SYNC pattern and a SYNC pattern of a next frame; and a receiving apparatus;

said transmitting apparatus including a pre-processor for pre-processing an input compressed data word string to generate pre-processed frames, a main data modulator operable in synchronism with said pre-processor, for generating a main data frame string by modulating said pre-processed frames N frames by N frames by said designated modulation scheme, said N being a positive integer determined by the modulation scheme and a convolutional coding rate, a TMCC generator operating in synchronism with the generation of each of said main data frames, for generating a corresponding TMCC signal, an OFDM modulator connected to receive said main data frame and said corresponding TMCC signal, and a transmission high-frequency unit connected to said OFDM modulator;

said receiving apparatus including a receiving high-frequency unit, an OFDM demodulator connected to said receiving high-frequency unit for demodulating said main data frame string and the TMCC signal corresponding to each of said main data frames, a TMCC regenerator for extracting said setting information from the demodulated TMCC signal and generating a frame signal indicating the head of each of said main data frames from selected one of the SYNC pattern and said sub-SYNC pattern and the identification information thereof in said demodulated TMCC signal, a main data demodulator for regenerating said N pre-processed frames from each of said demodulated main data frames based on said frame signal and said setting information, a circuit for generating the head position of each of said pre-processed frames from said frame signal; and an inverse processor for processing each of said pre-processed frames starting with the head position thereof inversely to said pre-processing thereby to regenerate said input compressed data word string.

4. A transmitting apparatus for transmitting a transmission signal including main data modulated by a designated modulation scheme and a TMCC signal having a SYNC pattern representing a header portion, at least a pair of a sub-SYNC pattern and identification information thereof, arranged between said SYNC pattern and the SYNC pattern of the next frame, and a bit pattern representing setting information indicating said modulation scheme, said apparatus comprising:
- a pre-processor for pre-processing an input compressed data word string to generate pre-processed frames;
- a main data modulator, operable in synchronism with said pre-processor, for generating a main data frame string by modulating said pre-processed frames N frames by N frames by said designated modulation scheme, said N being a positive integer determined by the modulation scheme and the convolutional coding rate;
- a TMCC generator, operable in synchronism with the generation of each of said main data frames, for generating a corresponding TMCC signal;
- an OFDM modulator connected to receive said main data frame and said corresponding TMCC signal;
- a transmission high-frequency unit connected to said OFDM modulator;
- a receiving high-frequency unit;
- an OFDM demodulator connected to said receiving high-frequency unit for demodulating said main data frame string and the TMCC signal corresponding to each of said main data frames;
- a TMCC regenerator for extracting said setting information from the demodulated TMCC signal and generating a frame signal indicating the head position of each of said main data frames from the SYNC pattern in said demodulated TMCC signal, said TMCC regenerator further generating the head position of each of said pre-processed frames from one of said SYNC pattern and said sub-SYNC pattern and the identification information thereof;
- a main data demodulator for regenerating said N pre-processed frames from each of said demodulated main data frames based on said setting information and said frame signal, and
- an inverse processor for processing each of said pre-processed frames from said main data demodulator starting with the head position thereof inversely to said pre-processing thereby to regenerate said input compressed data word string.

5. A transmitting system comprising:
a transmitting apparatus for a transmission signal including main data modulated by a designated modulation scheme and a TMCC having a SYNC pattern representing a header portion, a bit pattern representing the setting information indicating said modulation scheme and at least a pair of a sub-SYNC pattern and identification information thereof arranged between said SYNC pattern and a SYNC pattern of a next frame; and
a receiving apparatus;
said transmitting apparatus including
a first unit for pre-processing an input compressed data word string to generate pre-processed frames,
a modulation unit operable in synchronism with said pre-processor, for generating a main data frame string by modulating said pre-processed frames N frames by N frames by said designated modulation scheme, said N being a positive integer determined by the modulation scheme and a convolutional coding rate,
a second unit operable in synchronism with the generation of each of said main data frames, for generating a corresponding TMCC signal,
an OFDM modulator connected to receive said main data frame and said corresponding TMCC signal, and
a transmission high-frequency unit connected to said OFDM modulator;
said receiving apparatus including
a receiving high-frequency unit,
an OFDM demodulator connected to said receiving high-frequency unit for demodulating said main data frame string and the TMCC signal corresponding to each of said main data frames,
a TMCC regenerator for extracting said setting information from said demodulated TMCC signal, generating a frame signal indicating the head position of each of said main data frames from the SYNC pattern in said demodulated TMCC signal, and generating the head position of each of said pre-processed frames from said SYNC pattern or from said pair of sub-SYNC pattern and identification information thereof,
a main data demodulator for regenerating said pre-processed frames from each of said demodulated main data frames based on said setting information and said frame signal, and
an inverse processor for processing each of said pre-processed frames from said main data demodulator starting with the head position thereof inversely to said pre-processing thereby to regenerate said input compressed data word string.

* * * * *